US012071768B2

(12) United States Patent
Lozie

(10) Patent No.: US 12,071,768 B2
(45) Date of Patent: Aug. 27, 2024

(54) METHOD FOR COMPOSING A SET OF FLOOR PANELS

(71) Applicant: UNILIN BV, Wielsbeke (BE)

(72) Inventor: Klaus Lozie, Egem (BE)

(73) Assignee: UNILIN BV, Wielsbeke (BE)

( * ) Notice: Subject to any disclaimer, the term of this patent is extended or adjusted under 35 U.S.C. 154(b) by 835 days.

(21) Appl. No.: 17/057,998

(22) PCT Filed: May 24, 2019

(86) PCT No.: PCT/IB2019/054338
§ 371 (c)(1),
(2) Date: Nov. 23, 2020

(87) PCT Pub. No.: WO2019/229609
PCT Pub. Date: Dec. 5, 2019

(65) Prior Publication Data
US 2021/0207384 A1 Jul. 8, 2021

(30) Foreign Application Priority Data
May 31, 2018 (BE) .................................. 2018/5360

(51) Int. Cl.
*E04F 15/00* (2006.01)
*E04F 15/02* (2006.01)
(Continued)

(52) U.S. Cl.
CPC .............. *E04F 15/02* (2013.01); *G06F 30/10* (2020.01); *G06F 30/13* (2020.01); *E04F 2203/02* (2013.01); *G06F 2111/04* (2020.01)

(58) Field of Classification Search
CPC ..... E04F 15/02; E04F 15/00; E04F 15/02005; E04F 2203/00; E04F 2203/02; G06F 30/10; G06F 30/00; G06F 30/13; G06F 2111/04
See application file for complete search history.

(56) References Cited

U.S. PATENT DOCUMENTS 9,950,530 B2 * 4/2018 Imamura ................ B41J 2/1603
10,290,004 B1 * 5/2019 Conboy ............. G06Q 30/0635
(Continued)

FOREIGN PATENT DOCUMENTS

DE 10038886 A1 2/2002
WO 9747834 A1 12/1997
(Continued)

OTHER PUBLICATIONS

International Search Report and Written Opinion from PCT Application No. PCT/IB2019/054338, Aug. 2, 2019.
(Continued)

*Primary Examiner* — Chi Q Nguyen
(74) *Attorney, Agent, or Firm* — Workman Nydegger

(57) ABSTRACT

A method for composing a set of floor panels for flooring a room is based on a data set in accordance at least with the ground surface area of the room. The method includes the step of establishing a laying plan suitable for the room. The step of establishing a laying plan is carried out by means of a computer. The computer proposes a laying plan on the basis of the data set, taking into account desired limitations. The limitations are used to restrict a database of possible solutions.

13 Claims, 13 Drawing Sheets

(51) Int. Cl.
*G06F 30/10* (2020.01)
*G06F 30/13* (2020.01)
*G06F 111/04* (2020.01)

(56) References Cited

U.S. PATENT DOCUMENTS

| | | | | |
|---|---|---|---|---|
| 11,193,270 | B2* | 12/2021 | Asano | E04B 1/944 |
| 2009/0313931 | A1* | 12/2009 | Porter | B32B 21/02 |
| | | | | 52/309.3 |
| 2011/0146173 | A1* | 6/2011 | Visser | E04B 1/26 |
| | | | | 52/407.3 |
| 2012/0073228 | A1* | 3/2012 | Fork | E04C 2/06 |
| | | | | 428/221 |
| 2012/0121809 | A1* | 5/2012 | Vuozzo | A01N 59/14 |
| | | | | 427/317 |
| 2014/0123572 | A1* | 5/2014 | Segall | G09B 9/003 |
| | | | | 52/79.5 |
| 2015/0354199 | A1* | 12/2015 | Segall | E04B 1/61 |
| | | | | 52/127.6 |
| 2016/0123020 | A1* | 5/2016 | Tarn | B32B 38/0004 |
| | | | | 156/64 |
| 2019/0080030 | A1* | 3/2019 | Zukoski | G06T 17/00 |
| 2020/0147828 | A1* | 5/2020 | Sun | B27D 1/08 |
| 2021/0164238 | A1* | 6/2021 | Kuritz | B32B 27/365 |

FOREIGN PATENT DOCUMENTS

| | | |
|---|---|---|
| WO | 01447717 A1 | 7/2001 |
| WO | 0175247 A1 | 10/2001 |
| WO | 2009122332 A1 | 10/2009 |
| WO | 2014195281 A1 | 12/2014 |
| WO | 2018100526 A1 | 6/2018 |

OTHER PUBLICATIONS

Search Report from corresponding BE Application No. BE201805360, Dec. 20, 2018.

* cited by examiner

METHOD FOR COMPOSING A SET OF FLOOR PANELS

BACKGROUND

The present invention relates to a method for composing a set of floor panels.

More specifically, the invention relates to a method for composing a set of floor panels that is intended for flooring a specific room.

Floor coverings that are assembled from floor panels are now widely known, for example from WO 97/47834. The floor panels disclosed therein relate, inter alia, to laminate floor panels, the edges of which are provided with mechanical coupling parts that allow the laminate floor panels to be assembled into an interlinked floating floor covering. The floor panels from WO 97/47834 make it possible for the average DIYer to install a floor covering themselves, mainly because it is not necessary to glue the panels together with this type of floor panels. The floor panels provided all exhibit a common shape and dimension, and the installation does require some skill and experience in order to smoothly adjust the floor panels to the room to be floored, for example at the start or end of a row of floor panels, for the last row, or where particular situations arise, for example in order to allow the passage of utility lines. In addition, a good installation must meet certain requirements, such as minimum dimensions of the start and end panels of a row, minimum distance between short edges of floor panels in adjacent rows, and a sufficiently large expansion joint at the walls, and so on. The size of the expansion joint often depends on the type of floor covering and/or on the geographical region in which the room to be floored is located. Failing to meet one or more of these requirements or limitations may lead to a loss of warranty, and to a defective floor. Carrying out the adaptations needed for the room takes a lot of time and leads to noise and dust, which for now is seen as a necessary nuisance. It should be noted that there is a market trend for floor panels of larger dimensions, for example with a length of 180 centimetres or more, and a width of 20 centimetres or more. This means that it is also necessary to carry out a larger number of adaptations to floor the same room. Often, the adaptations required in the case of larger panels are also more complicated.

A method is known from WO 2001/047717 for producing floor panels in which a main decor, for example a world map, extends over several floor panels. Each of the floor panels is digitally provided with a decor, so that the aesthetic desires of the user can be fulfilled. The floor panels may be provided with an identification marking for the purposes of smooth installation. However, the installation still always requires the adaptations described above.

WO 2014/195281 discloses a method in which veneers intended for the top layer of veneer floor panels are cut from wood in an optimum manner. The edges of the veneers more or less follow the natural curvature of the wood, but are adapted to form a predetermined floor surface area together with veneers of the same type. The contours of the veneers are determined using a computer program which uses the ground surface area of a room to be floored as the basis and takes into account certain requirements, for example regarding the minimum distance between short edges of veneers in adjacent rows. The veneers that are obtained are glued onto a substrate of the same shape, such as onto chipboard, resulting in floor panels having an irregular shape that nevertheless provide a complete and closed floor surface area for the room in question. The floor panels are all provided with a label. The method of WO'281 is cumbersome and, for example, does not offer any solution in the event of utility lines that need to be passed through or in the event that other fixed objects are present in the room, such as supporting posts, walls or heavy, fixed, custom-made furniture.

PCT/IB2017/057530 of the present applicant, which had not yet been published on the filing date of the present application and is therefore part of the secret prior art, describes a set of floor panels that is suitable for and preferably intended for flooring a room, wherein the set comprises a plurality of first floor panels, wherein these first floor panels exhibit a common shape and dimension, and wherein the set further comprises one or more second floor panels, which exhibit an adaptation of the common shape and/or the common dimension or are provided for this purpose, wherein said adaptation is in accordance with said room. The above-mentioned PCT further describes several methods for composing such sets of floor panels, and/or for generating a detailed laying plan.

SUMMARY

The object of the present invention is, first, an alternative method for composing a set of floor panels intended for flooring a room, wherein, according to various preferred embodiments, a smoother manner a detailed laying plan is obtained.

The method of the invention preferably leads to a set of floor panels suitable for and preferably intended for flooring a room, characterized in that the set comprises a plurality of first floor panels, wherein these first floor panels exhibit a common shape and dimension, and in that the set further comprises one or more second floor panels, which exhibit an adaptation of the common shape and/or the common dimension or are provided for this purpose, wherein said adaptation is in accordance with said room.

The phrase "set of floor panels intended for flooring a room" is intended to refer to the fact that this set has not yet been installed, but is prefabricated, in particular at least in such a way that said second floor panels exhibit the required adaptations or are provided for this purpose, and must still be installed in the relevant room.

It is clear that said first floor panels may possibly exhibit small differences in shape and dimension as a result of production tolerances, or due to a difference in climate control, for example a difference in relative humidity in the case of wood-based floor panels. It is clear to the person skilled in the art that two or more first floor panels still exhibit a common shape or dimension even in the case where these first floor panels exhibit differences in the relevant dimension or shape, with these differences falling within the maximum deviation permitted in the standard for the relevant floor type, for example, in the case of laminate floor panels, within the maximum permitted deviations of the standard EN 13329.

It is also clear that shape and dimension is intended to refer to the shape and dimensions in the plane of the floor covering. It is of course preferable that the first floor panels and second floor panels should exhibit the same thickness.

According to the most significant example of first floor panels, these are rectangular and preferably elongate floor panels, with these first floor panels having both length and width in common. According to this example, the first floor panels exhibit a common rectangular shape having common length and width dimensions. According to another example of first floor panels, these are rectangular and elongate floor panels, with these first floor panels only having the width in common, and with the length either varying randomly or being chosen from a limited set, for example a set of three different lengths. Random lengths often occur in the case of panels for solid parquet. According to this example, the first floor panels exhibit a common rectangular shape with a common width measurement, but with different length measurements. According to yet another example of first floor panels, these are rectangular and elongate floor panels, with these first floor panels only having the length in common, and with the width being chosen from a limited set, for example a set of three different widths. Using such floor panels, it is possible to install alternating rows of wide and narrower panels. According to this example, the first floor panels exhibit a common rectangular shape with a common length measurement, but with different width measurements.

It is clear that it is not excluded that a set of floor panels according to the invention may comprise several types of first floor panels. Thus, for example, the set of floor panels may comprise several first floor panels of a first type that exhibit a first, for example square, shape, as well as several first floor panels of a second type that exhibit a second, for example rectangular, shape. Such a set may be intended, for example, to realize a floor covering having a central tile motif consisting of first floor panels of the first type, which is outlined along the edges by a plank motif consisting of first floor panels of the second type. Preferably, the set of floor panels then in each case also comprises corresponding second floor panels, namely second floor panels of a first type that exhibit an adaptation of the shape and dimension of the first floor panels of the first type, as well as second floor panels of a second type that exhibit an adaptation of the shape and dimension of the first floor panels of the second type.

In general, it is clear that the dimensions and shape of the first floor panels in the set of the invention are not adapted in any way whatsoever, and certainly not in accordance with the room for which they are intended. If desired, however, they may be provided with a marking to indicate their place in the room.

The first floor panels are preferably standard floor panels, for example rectangular and elongate floor panels, preferably having a length of less than 2.5 metres. The mass production of floor panels is tailored to this shape. Preferably, the width of the panels is between 10 and 25 centimetres and/or the length of the panels is between 80 and 150 centimetres. As a result of the fact that the set of floor panels relates to a combination of at least first floor panels having a common shape and dimension, preferably common length and width, with adapted second floor panels, it is possible in a rational manner to offer a floor adapted to, and possibly tailored to, the relevant room.

According to the most preferred embodiment, said adaptation is an adaptation that is carried out in advance and separate from the actual installation. Thus, for example, the producer of the floor panels can carry out the required adaptations, or the distributor of the floor panels can do so. As will also become clear below, the second floor panels may also be provided purely to be adapted, as a result of having, for example, a line of break or due to the fact that the dividing line for the adaptation is indicated on the floor panel. In the context of the invention, these are therefore in each case lines of break or indications that are made in advance and separate from the actual installation.

Preferably, the set comprises at least the number of first and second floor panels that are needed to floor said room, wherein the second floor panels then exhibit the necessary adaptations in accordance with the relevant room or are provided for the purpose of these adaptations.

Preferably, the set of floor panels may be used without further adaptations to floor said room.

Preferably, said set contains at least second floor panels wherein said adaptation consists of a shortening of the length and/or width of the floor panels or wherein the adaptation comprises such a shortening. Floor panels whose length has been adapted may form the start or end of a row, with first floor panels being installed between the adapted floor panel at the start of the row and that at the end of the row. Floor panels whose width has been adapted may be used in a row that is parallel or approximately parallel to a wall. In the event of a rectangular room, this may be the start row and/or end row.

It is also noted for the purposes of clarification that, in the event first floor panels of a random length are used, a second floor panel whose length has been shortened is different from a first floor panel at least by virtue of the fact that such a second floor panel lacks edge markings at the short edge where the shortening has been carried out. Thus, for example, there will not be any chamfer, coupling means or other, for example protruding parts on this edge, while this is present in the case of the first floor panels.

Preferably, said set contains at least second floor panels, wherein said adaptation consists of the full or partial removal of protruding parts at one or more edges of the floor panels or wherein the adaptation comprises such a removal. This may relate, for example, to removed parts of coupling parts present on the edges, such as a protruding tongue part, or a protruding groove lip part. According to the prior art, an installer removes such parts during the flooring for the purposes of obtaining a more compact expansion joint, for example against a wall. Thus, the protruding tongue parts present at the long edges may be removed for a starting row of a floor covering.

Preferably, said set contains at least second floor panels, wherein said adaptation consists of an adapted contour provided on one or more edges of the floor panel, or wherein the adaptation comprises such an adapted contour. In this case, said contour may follow the course of a wall or another edge with a part of said room that is not to be floored. Providing such a contour is interesting, for example, in the case of walls that are not or not completely parallel to the long panel edges at the start or end of the floor installation. Preferably, the adapted contour is such that an expansion joint remains between the adapted contour and the wall. Preferably, the expansion joint exhibits a constant width, or at least a width that exhibits a possible variation in its width of less than 40%. Thus, for example, the width of the expansion joint may be approximately 10 millimetres plus or minus 2 millimetres. Preferably, the width of the expansion joint is adapted as a function of the geographical location where the room to be floored is located. Thus, in the case of wood-based flooring products for example, it is necessary to bear in mind a drying out and thus contraction of the flooring product during the winter in northern regions such as Scandinavia, as the heating in living areas causes low humidity. In southern regions, such as Oceania, it is then necessary to bear in mind a high relative humidity during the summer, and a corresponding expansion of the flooring product.

Preferably, said set contains at least second floor panels, wherein said adaptation consists of recesses and/or adapters provided on the relevant panel and intended for the passage of lines, or wherein the adaptation comprises such recesses and/or adapters. Such recesses and adapters are, for example, desirable in locations where heating pipes come out of the floor surface area. In this case, the adapter is, for example, the part of the panel that is located behind the heating pipes, when viewed from the room. Such a panel part or adapter must be laid separately from the actual second floor panel during the floor installation, in order to make it possible to work around the relevant lines. Preferably, the adapter is obtained from a standard floor panel other than the actual second floor panel in question. In this way, it is possible to obtain a perfect connection between the adapter and the actual second floor panel, namely without an intermediate distance, created by a sawing or other cutting line between the adapter and the actual second floor panel, remaining. Preferably, the adapter, if it is obtained from another standard floor panel, is configured in such a way that its decorative side corresponds to the decorative side of the actual second floor panel. According to the most preferable embodiment, the adapter, to this end, is obtained from a standard floor panel having an identical decorative side to the standard floor panel from which the actual second floor panel is obtained, and the adapter is preferably taken from that location of the standard floor panel which corresponds to the removed piece of the actual second floor panel, in such a way that the decors of the adapter and the actual part of the second floor panel merge into one another seamlessly or practically seamlessly. Floor panels having identical decorative sides are, for example, typically present in flooring products that exhibit a printed decor, such as is the case, for example, with laminate floor panels or LVT (Luxury Vinyl Tile) floor panels.

Preferably, said adaptation comprises the removal of a superfluous part of the relevant floor panel. This relates to a removal which is carried out in advance and separate from the installation. In other words, the relevant floor panel is supplied fully to measure as a function of the position that it will assume in the intended room.

According to a particular alternative, said adaptation comprises a line of break which is provided between the superfluous part and the useful part of the relevant floor panel. Such a line of break can then permit the ultimate user or installer to simply remove the superfluous part, for example without sawing operations being required. In other words, by means of the line of break provided, the relevant floor panel is simple to customise as a function of the position that it will assume in the intended room. Such a line of break is also provided on the relevant second floor panel in advance and separate from the installation. Preferably, the useful part and/or the superfluous part of the second floor panel is provided with a marking or other indication, so that the user can determine whether the part in question is useful or superfluous.

According to yet another alternative, said second floor panels exhibit an indication according to which the relevant second floor panels must be adapted in order to be brought into conformity with said room. Thus, for example, the division of the relevant floor panel that is to be carried out may be indicated by a dividing line applied thereon and/or the superfluous part and/or the useful part of the floor panel may be marked. Such an indication is also provided on the relevant floor panel in advance and separate from the installation.

According to yet another alternative, said second floor panels exhibit instructions for use, for example, according to which they must be laid. This may relate, for example, to an instruction to glue the relevant second floor panel to the substrate, while the floor covering otherwise essentially consists of a floating floor covering. This is useful, for example, in the case of thermoplastic floor panels, such as so-called LVT (Luxury Vinyl Tile), in those places where they may be subject to the direct incidence of sunlight. It is known that such panels have the tendency to expand in such a situation. In that case, the panels then arch out of the floor surface area in some places. In order to prevent this, gluing the panels to the substrate in some places is a good option.

The lines of break and/or indications mentioned above are, for example, extremely useful in the case of small superfluous parts or small useful parts of floor panels. Especially in the case of small useful parts, the risk of inaccuracies occurring is prevalent in an automatic production environment. There is also the risk of losing such parts, whether in production or during installation. Not removing or fully removing superfluous parts of the floor panels, but instead indicating dividing lines or providing lines of break can also lead to a more stable packaging unit.

It is clear that the set of floor panels may comprise different types of second floor panels, for example floor panels from which the superfluous part has been removed, floor panels whose superfluous part has been provided with a line of break from the useful part and/or floor panels with the indication of a dividing line necessary for dividing the useful and the superfluous part. It is also possible for one and the same floor panel to exhibit both a removed part, a line of break and/or an indication.

Preferably, a plurality of said floor panels that exhibit an adaptation, or are provided for this purpose, are packaged together in a packaging unit. In the event that the adaptation comprises a removal of the superfluous part, it is advantageous if the relevant unit also contains one or more superfluous parts created by said adaptation or removal. This creates a stable stack of second floor panels in a packaging unit.

The invention of the first aspect is mainly useful for composing a set of floor panels that is suitable for forming a floating floor covering. Such floor panels are eminently suitable for installation by DIYers, but require specific adaptations such as the adaptations associated with providing sufficiently large expansion joints. Floor panels for a floating floor covering preferably exhibit coupling parts on at least two opposite edges, which coupling parts allow two such floor panels to be connected to one another, wherein a locking is brought about on the relevant edges both in a direction perpendicular to the plane of the coupled panels and in a direction in the plane of the panels and perpendicular to the relevant edge. Such coupling parts may, for example, be configured as a locking tongue-and-groove connection, for example of the type known from WO 97/47834. Such coupling parts usually also exhibit protruding parts on one or more of said edges. In such an event, an adaptation is desirable in which, in the case of a number of said floor panels, these protruding parts are removed from one or more edges or are provided in order to be removed.

As mentioned above, the first aspect of the invention relates to a method for composing a set of floor panels for flooring a room, based on a data set in accordance at least with the ground surface area of said room, wherein the method contains the step of establishing a laying plan suitable for said room, characterized in that the step of establishing a laying plan is carried out by means of a computer, wherein the computer proposes a laying plan on the basis of said data set, taking into account desired limitations, wherein said limitations are used to restrict a database of possible solutions, i.e. possible laying plans or partial laying plans.

Said database of possible solutions may, for example, comprise coordinates of possible positions of short edges of floor panels. According to the invention, the database is then restricted or, in other words, a number of possible positions are removed from the database on the basis of the desired limitations. Thus, for example, all positions of short edges of floor panels that would lead to a start or end panel in a row shorter than the minimum dimension can be removed from the database and/or, in the case of an irregular bond, all positions closer than a minimum distance to be maintained from the position of a short edge in one or more previous rows can be removed from the database. The restriction of the database can be carried out by the computer gradually, namely, when establishing the partial laying plan for a certain row, it is possible, on the one hand, to take into account the existing database of possible solutions and, on the other hand, the relevant database can be updated with newly created limitations associated, for example, with said partial laying plan.

Preferably, said step of establishing a laying plan comprises at least the following sub-steps:

proposing at least a panel in a first row, wherein said panel complies with said database of possible solutions;

updating or restricting said database of possible solutions on the basis of at least the position of the short edge of said panel in the first row;

proposing at least a panel in a second row, wherein said panel complies with the updated or restricted version of said database. It is clear that, according to the present preferred embodiment, "first" and "second" row cannot be interpreted as being limiting, but instead indicate the order of establishing the laying plan, namely that the partial laying plan for the first row is determined before the partial laying plan for the second row is determined.

It should be noted that, in the frequently occurring case of first floor panels that exhibit a common rectangular shape having a common length and width dimension, said database of possible solutions can be limited to the position of only one of the short edges of the floor panels in a relevant, uninterrupted, row. This is because the position of the short edges of the other floor panels in the relevant row is directly associated with this one position.

Preferably, the sub-steps of the above preferred embodiment are carried out until a full laying plan is obtained for the relevant room to be floored. Preferably, panels are proposed row by row, preferably, but not necessarily, in the order in which they occur in the room to be floored. In the event that the database of possible solutions is empty before a full laying plan is obtained, namely if it becomes impossible to propose a panel in a following row that complies with the updated or restricted version of said database, one or a combination of two or more of the following measures may be taken:

the measure in which another solution is proposed for the partial laying plan of a preceding row and/or the position of a preceding panel, optionally in a preceding row, said solution likewise complying with the original database of possible solutions therefor. The phrase "original database of possible solutions therefor" is used to refer to the version of this database that was used to propose the previous solution for this partial laying plan or this panel.

the measure in which the desired limitations are made less strict, at least until the database of possible solutions comprises at least one possible solution for the relevant panel. Preferably, the desired limitations are reverted to the original desired level as soon as this once again leads to possible solutions.

the measure in which the computer asks for human input regarding the unsolvable situation in a relevant row, or for a relevant panel, either after or before the remaining solvable parts of the laying plan have already been proposed.

According to a variant of the present invention, instead of using a database of possible solutions, a database of undesirable solutions is used. It is clear that such a variant, mutatis mutandis, has equivalent preferable embodiments to the case of a database of possible solutions.

Preferably, said database of possible solutions, or, in accordance with the variant, of undesirable solutions, at least excludes that short edges of floor panels in adjacent rows are positioned closer than a minimum distance to be maintained. This minimum distance may, in the event of a lack of possible solutions, be reduced in such a way that it is nevertheless possible to achieve a suboptimal result in a certain row. This achieves a measure such as that stated above.

Preferably, said database of possible solutions, or, in accordance with the variant, of undesirable solutions, at least excludes that a short edge of a floor panel is positioned closer than a minimum distance to be maintained from the start or end of a row. This minimum distance to be maintained, or minimum dimension of the relevant panel, may, in the event of a lack of possible solutions, be reduced in such a way that it is nevertheless possible to achieve a suboptimal result in a certain row. This achieves a measure such as that stated above.

Preferably, the method further comprises the preceding step of generating said data set at least in accordance with the ground surface area of the room to be floored.

Preferably, the method further comprises the step of producing the required floor panels which, according to the established laying plan, exhibit an adaptation or are provided for this purpose, and/or the step of providing at least the required quantity of floor panels having common dimensions.

The invention also, with the same object and according to an independent second aspect, relates to a data carrier having a software code that, when executed by a processor, leads or may lead to a method having the features of the first aspect, the variant thereof and/or the preferred embodiments thereof.

The invention also, with the same object and according to an independent second aspect, relates to a set of floor panels intended for flooring a room, having the feature that the set comprises a plurality of first floor panels, wherein these first floor panels exhibit a common shape and dimension, and in that the set further comprises one or more second floor panels that exhibit an adaptation of the common shape and/or the common dimension or are provided for this purpose, wherein said adaptation is in accordance with said room and wherein the set of floor panels is composed using a method having the features of the first aspect, the variant thereof and/or the preferred embodiments thereof.

Preferably, said adaptation is carried out by removing the superfluous part from the relevant floor panel.

Preferably, a plurality of said floor panels that exhibit an adaptation, or are provided for this purpose, are packaged together in a packaging unit, and this unit also contains the superfluous pieces created by said adaptation.

It is clear that the method of the first aspect preferably contains the steps of generating a data set in accordance at least with the ground surface area of said room, establishing a laying plan suitable for said room, namely using a database of possible solutions and/or of undesirable solutions, producing the required second floor panels which, according to the establishing laying plan, exhibit an adaptation or are provided for this purpose, and, preferably, providing at least the required quantity of first floor panels having a common shape and dimension, or dimensions.

Generating said data set in accordance at least with the ground surface area of said room is preferably carried out using an automatic measuring device. This may relate to a measuring device which scans the room and thus, for example, generates a point cloud comprising at least a two-dimensional image of a part of the floor plan of the room. The relevant measuring device may carry out its measurement optionally from various positions in the relevant room, and/or from various perspectives, for example depending on the visibility of the walls of the relevant room. The various point clouds thus created are mutually referenced by means of the position and perspective adopted so that a full image of the ground surface area of the relevant room, and more specifically of the walls thereof, is created. This full image is digitally stored and forms at least the basis of said data set.

It is clear that establishing said laying plan is preferably carried out on the basis of said data set, or in other words on the basis of the digital floor plan.

According to the invention, the step of establishing said laying plan is preferably carried out by means of a computer, wherein the computer proposes a laying plan on the basis of said data set, taking into account desired limitations. There may be a wide variety of desired limitations. A first limitation is the dimension and shape of the first, or standard, floor panels. These first floor panels are taken from an available flooring product which is selected by the end user on the basis of personal preference. A second limitation is the type of laying plan. On the basis of his personal preference, the end user may opt for rows in irregular bond, rows in half bond, rows along the diagonal of the relevant room or for special patterns such as a herringbone pattern and so on. Preferably, the end user also specifies the main direction of the rows or patterns. Preferably, the end user also gives the geographical location of the room to be floored. Taking into account yet further limitations, such as for example the minimum dimension of expansion joints required for the flooring product in question, preferably as a function of the geographical location of the room, and for example the minimum dimension of panels at the start or end of a row, and on the basis of said data set or digital floor plan, the computer then proposes a final detailed laying plan which is suitable for flooring the relevant room. As mentioned above, use is made in this case of a database of possible solutions and/or undesirable solutions which takes into account one or more of said limitations. From this obtained laying plan, the required number of first floor panels, namely floor panels having a common shape and dimension, can be calculated, as well as the number of said second floor panels having their required adaptation. The calculation of the required adaptation is based on determining the cutting points/cutting lines between the digital floor plan and the laying plan. The result of the calculation can then be used to automatically compose the set of floor panels which is intended for flooring said room. This automatic composition may involve, inter alia, the production of said second floor panels on the basis of standard panels, similar to said first floor panels. This production may involve carrying out one or more of the adaptations, or provisions for this purpose, which are mentioned in the context of the first aspect of the invention. Preferably, said calculation is used to generate CAD/CAM (Computer Aided Design/Computer Aided Manufacturing) data for each of said second floor panels, wherein these data are suitable for controlling a processing machine, such as a surface milling cutter and/or crosscut saw and/or laser cutting machine and/or water jet cutting machine or other cutting apparatus, so that the necessary adaptation, indication and/or line of break can be brought about.

Other or further limitations are of course possible. It is, for example, advantageous to ensure, in a situation in which the end joints of the floor panel rows are at right angles to a wall having a door opening, that at least one of these joints is located at the door opening.

Depending on the desired ease of use and the desired customer specificity, several steps of the method may optionally be left to the user. Establishing the suitable laying plan may, for example, be left to the end user. The end user may carry that out using a computer and suitable software, but it is also possible for the end user to pass on his desired type of laying plan and for the suitable final laying plan to then be established by the producer, distributor or architect by means of a computer and suitable software. Depending on the steps carried out by the end user, it is possible that other data are available for manufacturing the second floor panels. It is, for example, possible that the data only comprise the digital floor plan. It is also possible that the data comprise at least the geometry of each second floor panel.

Preferably, a computer proposes a detailed laying plan for a certain room on the basis of said data set. Determining such a detailed laying plan preferably comprises the following steps:

- the step of determining the main direction of the panel rows, preferably to be entered by the user, for example by indicating that the main direction must be parallel to a part of the boundaries of the digital floor plan, as contained in said data set;
- the step of determining the position of the longitudinal edges of panel rows; this step can be carried out automatically, preferably in such a way that the average width of the panel rows is greatest at the edges, and wherein the width for each row at such an edge is at least half the width of the panels from the relevant flooring product over as great a length of the relevant row as possible;
- the step of calculating cutting points between said longitudinal edges of panel rows and the digital floor plan, more specifically the external and, preferably, also the internal, boundaries of this floor plan;
- the step of using said cutting points to identify start and stop positions in panel rows of full width, and concave and convex loops that extend in the same panel row;
- the step of proposing first and second floor panels between the start and stop positions in each panel row, taking into account desired limitations, namely by proposing panels that comply with the database of possible solutions, and taking into account any concave loops in the relevant panel row;
- the step of proposing second floor panels at the location of said convex loops, likewise taking into account desired limitations.

The obtained detailed laying plan is then further used as explained for composing the set of floor panels which is intended or suitable for flooring the relevant room. It is clear that the step of determining the position of the longitudinal edges of panel rows, in the event of a flooring product with panels of two or more widths, must take into account the desired variation in the width of the rows, for example alternating wide and narrow rows.

Due to the fact that the detailed laying plan is composed row by row, it is possible to allow the final laying plan to comply with more extensive limitations. Thus, for example, it is possible to use a superfluous part of a second floor panel from a previously composed row entirely or partially as a useful part in another row that is yet to be composed. In this way, it is possible to experience less loss when working. According to another example, it is possible to ensure that a passage for a utility line coincides with a pair of transverse panel edges. This considerably increases the ease of installation and provides an aesthetically pleasing and high-quality result.

It is clear that it is not strictly necessary for the method to comprise the step of providing at least the required quantity of first floor panels having a common shape or dimension, or dimensions. This is because it is possible for the end user to provide sufficient standard panels himself and to use another party to provide one or more of the second floor panels.

It is preferable for at least the second floor panels to comprise an identification which allows their envisaged position in the floor to be determined, optionally in conjunction with a laying plan. The first floor panels may optionally also be provided with such an identification. The identification of first floor panels may be useful in the event that the set of the invention comprises first floor panels having an identical or quasi-identical decorative side, for example in the event of floor panels which are provided on their surface with a printed decor, for example with an imitation of wood. The identification may be carried out in such a way that it is prevented that such first floor panels are included close to one another in the floor plan, which can highlight that it is an imitation. An identification may also be useful in the event that there are several types of first floor panels, for example first floor panels having two or more different shapes and/or dimensions, in order to ensure the desired laying pattern. In general, the identification may also depict an order of installation according to which the floor covering can be installed in the simplest manner.

Although the invention is primarily intended to be used in the case of floor coverings which are assembled from panel-shaped elements, it is clear that, according to a different variant, it can also be used in the case of floor coverings which are assembled from elements in strip form, such as the strips of wall-to-wall vinyl or wall-to-wall carpet.

BRIEF DESCRIPTION OF THE DRAWINGS

With a view to giving a more detailed description of the features of the invention, several preferred embodiments are described below by way of non-limiting example with reference to the attached drawings, in which.

DETAILED DESCRIPTION OF VARIOUS EMBODIMENTS

Figure 1:
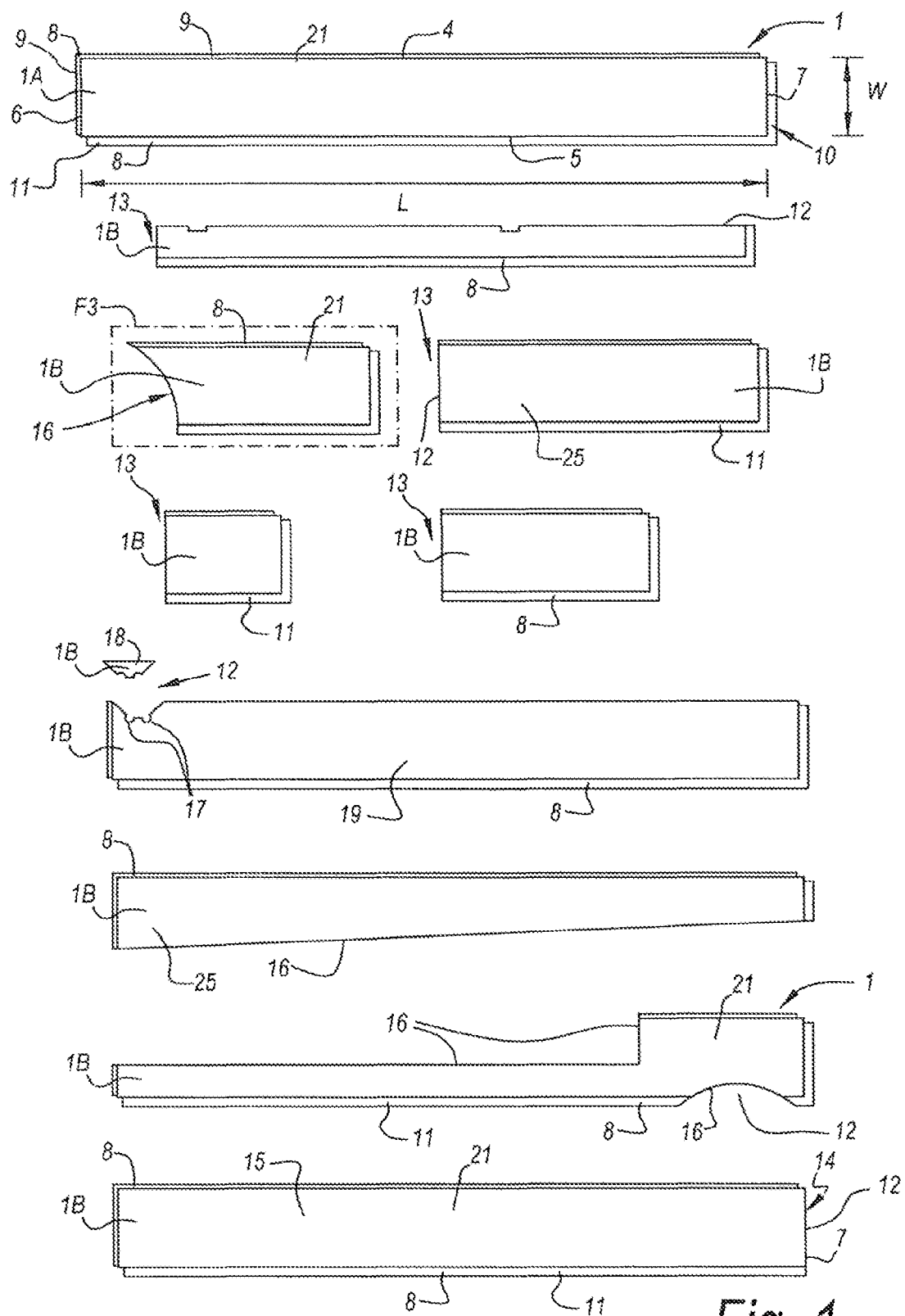
FIG. 1 shows a part of a set of floor panels having the features of the present invention.
Figure 2:
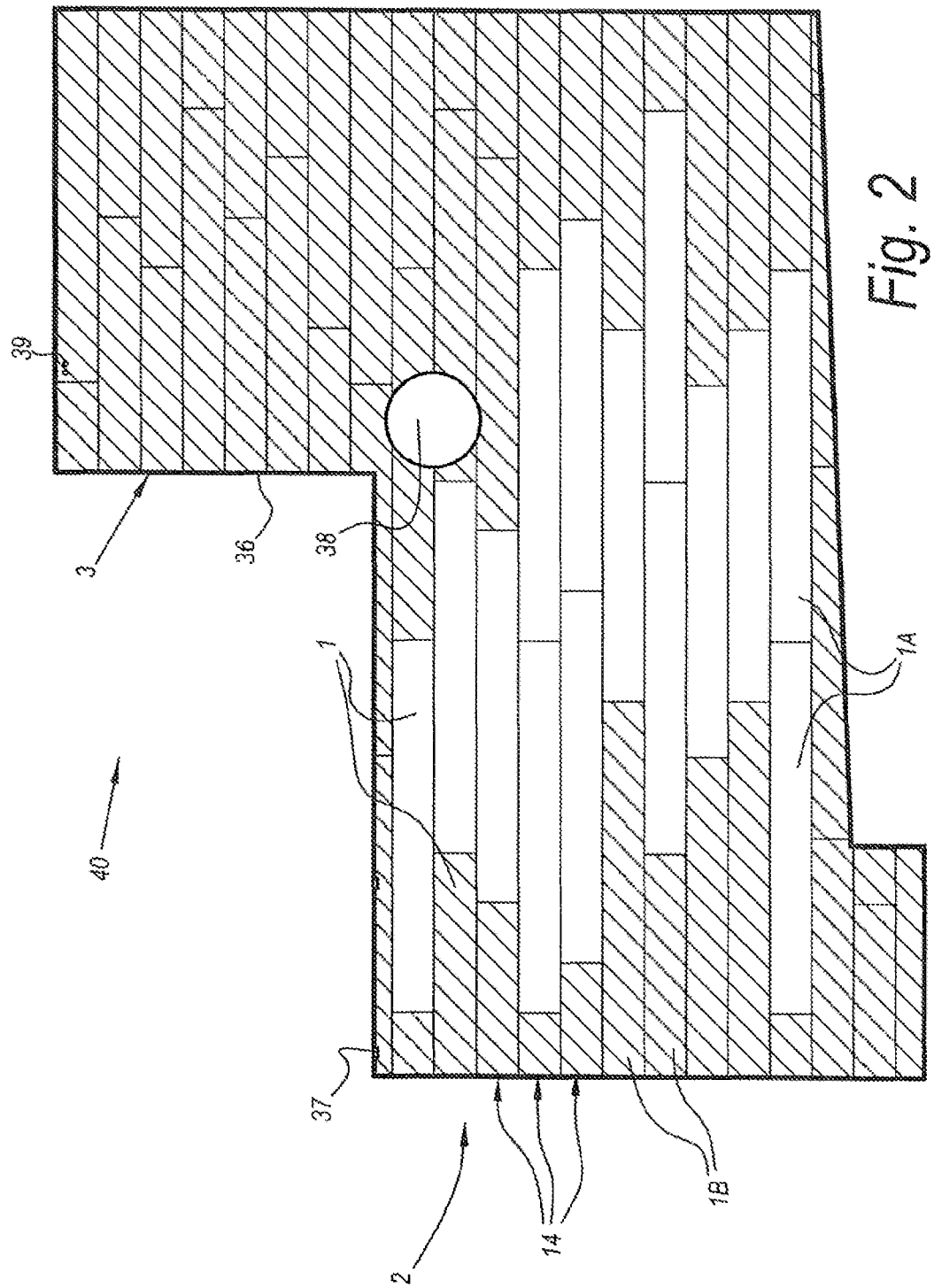
FIG. 2 shows a top view on a smaller scale of a room which is floored with the aid of the set of floor panels, a part of which is illustrated in FIG. 1.

FIG. 1 shows panels 1 from a set of floor panels 2 which, as shown in FIG. 2, is intended for flooring a room 3. The panels 1 of FIG. 1 are:
  a first floor panel 1A, of which the set contains several and which exhibit a common shape and dimension. In the example, these are floor panels 1A with a rectangular and elongate shape having relatively large dimensions, namely a length L of more than 2 metres and a width W of more than 20 cm. The floor panels 1 are intended for forming a floating floor covering and to this end are provided on their edges 4-5-6-7 with mechanical coupling parts 8 in the form of a tongue 9 and a groove 10, wherein the groove 10, in the example, exhibits a protruding lower groove lip 11;
  several second floor panels 1B from said set 2, which exhibit an adaptation 12 of the common shape and/or the common dimension. The relevant adaptation 12 is in accordance with said room 3.

Said first floor panels 1A are standard floor panels of a chosen flooring product. Said second floor panels 1B are obtained by adapting such standard floor panels in accordance with the room 3 to be floored. In this case, the adaptation 12 relates in each case to a removal of the superfluous parts of the relevant floor panel 1B. The adaptation is in each case carried out in advance and separate from the actual installation. The set of floor panels 2, a part of which is illustrated in FIG. 1, is supplied with the required adaptations 12 or second floor panels 1B.

The set 2 comprises, in the example, at least second floor panels 1B, wherein said adaptation 12 comprises a shortening 13 of the length. These second floor panels 1B are suitable for forming the beginning or the end of a row 14 of floor panels 1.

The set 2 comprises, in the example, at least second floor panels 1B, wherein said adaptation 12 to the shape comprises a removal 14 of protruding parts from an edge. In the case of the illustrated panel 15, this relates to the removal of the protruding lower groove lip 11 from a short edge 7.

The set 2 comprises, in the example, at least second floor panels 1B, wherein said adaptation 12 comprises an adapted contour 16 which is provided on one or more edges. The contour 16 can be adapted to walls 36 and/or other edges of the room 3, such as pillars 38 or support posts which are present.

The set 2 comprises, in the example, at least second floor panels 1B, wherein the adaptation 12 comprises recesses 17 and an adapter 18 intended for passing through lines, for example central heating pipes. It is possible in this case for the adapter 18 to be obtained from another floor panel than the actual part 19 of this second floor panel 1B. Specifically, in this way, it is possible to prevent the material removed by a saw line between the actual part 19 and the adapter 18 causing a seam in the final floor covering. By producing the adapter 18 from another floor panel, it is possible to obtain a connection with the actual part 19 of the floor panel 1B.

The set 2 of the example comprises at least all first floor panels 1A and second floor panels 1B necessary for flooring the relevant room 3, and, in this case, the set 2 is configured in such a way that no further adaptations need to be made for flooring the intended room 3. That is, in general, not necessary according to the invention. As second floor panels 1B, the set 2 should, for example, only contain those which comprise an adaptation 12 that goes beyond a removal 14 of protruding parts from an edge and/or a linear shortening 13 of the length L of the floor panels 1.

FIG. 2 shows the second floor panels 1B, which are needed for flooring the relevant room 3, hatched. As the first floor panels 1A have relatively large dimensions in comparison with the surface area of the room 3, the second floor panels 1B cover more than 50% of the surface area.

Figure 3:
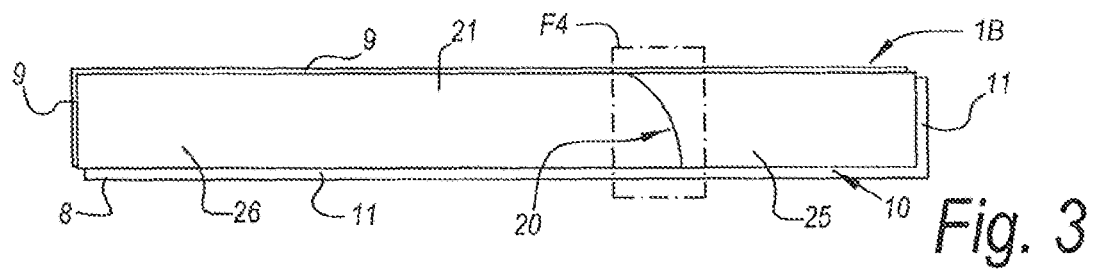
FIG. 3 shows a variant for the panel which is in area F3 in FIG. 1.

FIG. 3 shows an alternative second floor panel 1B which is provided to be adapted according to an indication 20 provided on the panel, in this case a dividing line. This dividing line is provided on the relevant floor panel in advance and separate from the installation. The indication is shown here on the decorative side 21 of the floor panel 1B, but may also be applied to the bottom side thereof. The dividing line or indication 20 may also extend to one or more of the coupling parts 8 provided on the edge.

Figure 4:
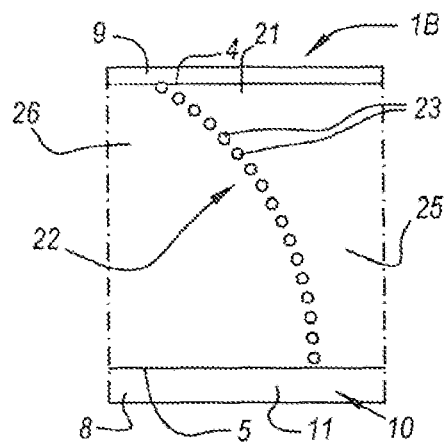
FIGS. 4 to 7 show a view on a larger scale and for variants of the area which is indicated in FIG. 3 by F4.
Figure 5:
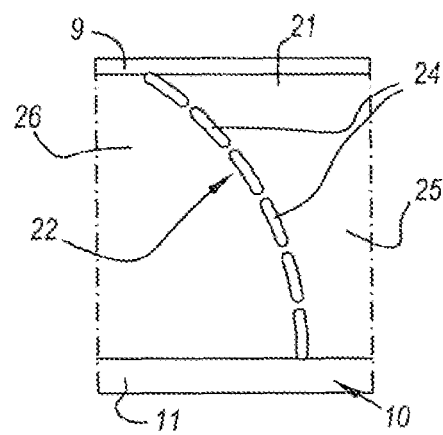

FIG. 4 shows another alternative second floor panel 1B which is provided to be adapted. To this end, the panel is provided with a line of break 22 which, in this case, comprises a series of continuous holes 23 along an envisaged dividing line. FIG. 5 shows an alternative having several elongate continuous slits 24 along an envisaged dividing line. It goes without saying that holes 23 and slits 24 can be combined in order to provide the same line of break 22.

Figure 6:
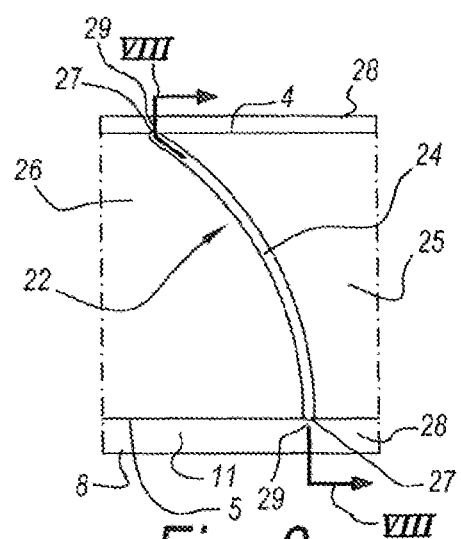
Figure 7:
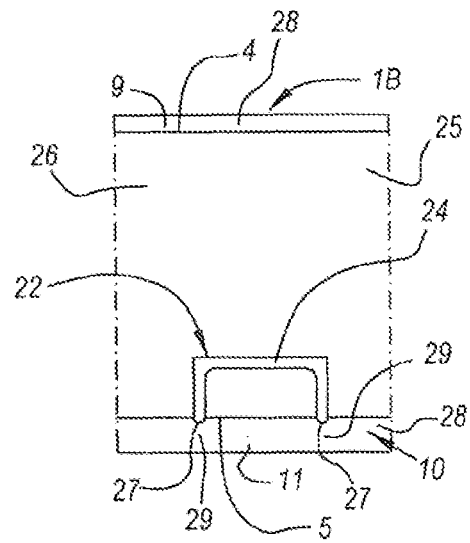

FIG. 6 shows another alternative having only one continuous slit 24 which extends substantially over the entire dividing line. In the example, the useful part 25 of the floor panel 1B is only connected to the superfluous part 26 via the coupling parts 8 of the floor panel 1B. For the purposes of clarification, FIG. 7 also shows such an example, but for a different second floor panel 1B which does not belong to the set 2 of the example. In the example of FIG. 6, the line of break 22, as illustrated in greater detail in FIG. 8, extends between positions 27 which, on two different edges 4-5, in this case opposite edges, are proximal to the distal ends 28 of the coupling parts 8 present there. In other words, the distal parts 28 of these coupling parts 8 on the relevant edges 4-5 are not cut through. In the example of FIG. 7, the line of break 22 extends between different positions 27 on the same edge 5, which in each case are proximal to the distal end 28 of the coupling part 8 present there. It is clear that the user can sever the remaining connection 29 between the useful part 25 and the superfluous part 26 in a simple manner, for example manually or with a simple tool. It is also clear that, in the case of the type of lines of break 22 of FIGS. 6, 7 and 8, the useful part 25 may also be connected to the superfluous part 26 only via one remaining connection 29.

Figure 8:
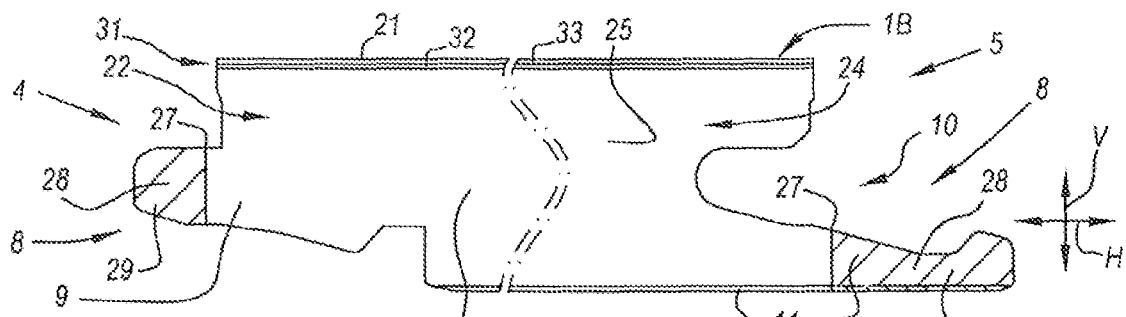
FIG. 8 shows a view on a larger scale along the line VIII-VIII illustrated in FIG. 6.

FIG. 8 further clearly illustrates that the example relates to laminate floor panels 1, namely floor panels consisting of a core 30 onto which a laminate top layer 31 having a printed decor layer 32 and a wear-resistant top layer 33 is applied, and wherein a backing 34 is applied to the bottom side of the core. It is clear that the invention can be used in the case of floor panels of any type whatsoever, thus, for example, it is also used in the case of wooden floor panels, such as prefabricated parquet, or in the case of plastic floor panels, such as LVT panels, wherein other types of top layers are then used. It is clear to the person skilled in the art that the lines of break 22 displayed here likewise apply to these other types of floor panels.

FIG. 8 further shows that the floor panels 1A-1B of the example are provided, on at least one pair of opposite edges 4-5, with mechanical coupling parts 8 which allow two such floor panels 1A-1B to be coupled to the relevant edges 4-5, wherein, in the coupled state, a locking is brought about both in a vertical direction V perpendicular to the plane of the panels and in a horizontal direction H perpendicular to the relevant edges 4-5 and in the plane of the panels. Such coupling parts 8 may be configured in a variety of different ways. In the example, they are provided substantially as a tongue-and-groove coupling. It is clear from FIG. 1 that, in this case, the short edges 6-7 are also provided with mechanical coupling parts 8. This may also relate to a locking tongue-and-groove connection of the type illustrated in FIG. 8. Other possibilities, such as so-called push-lock coupling profiles, are not excluded. Such push-lock coupling profiles permit a locking by means of a downwards movement of the panel edges towards one another and are known, for example, from WO 01/75247.

Figure 9:
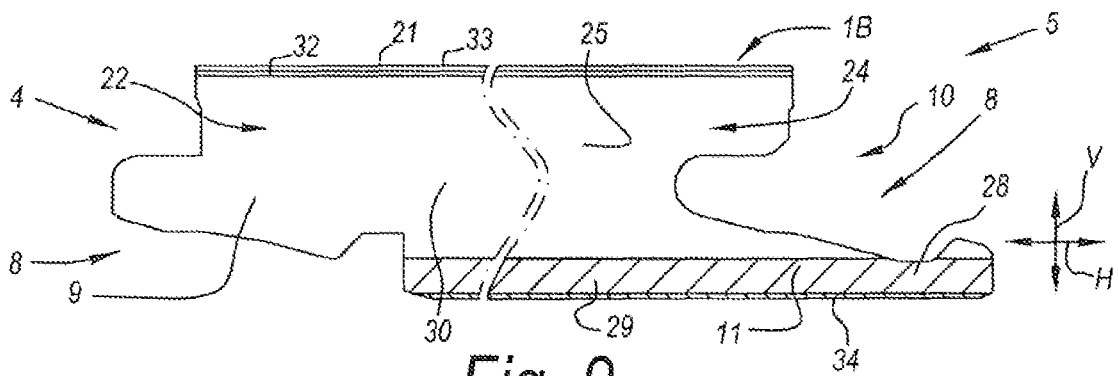
FIGS. 9 to 14 shows variants in the same view.

FIG. 9 shows another embodiment in which the line of break 22 is configured as a non-continuous slit 24, wherein the useful part 25 and the superfluous part 26 of the floor panel 1B remain connected by means of a remaining connection 29 in the form of a material part present on the bottom side of the floor panel. Preferably, this material part, as in the present case, comprises a part of the core 30.

Figure 10:
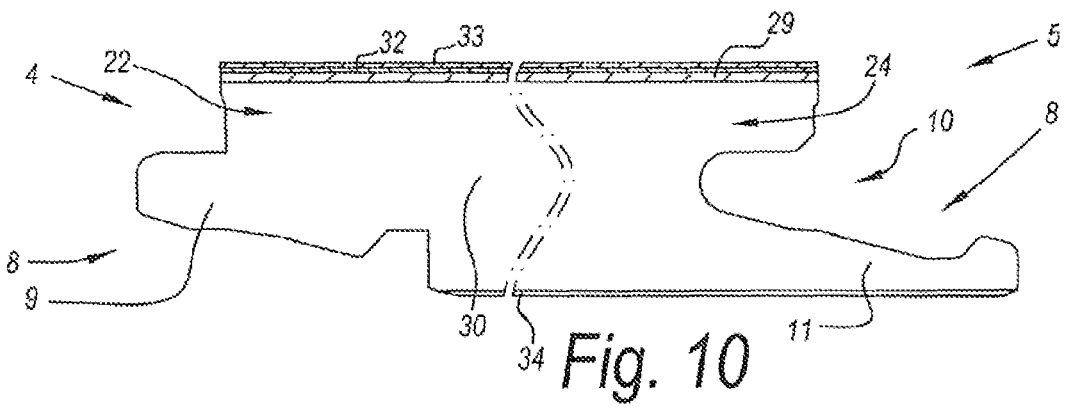

FIG. 10 shows an embodiment in which the line of break 22 is configured as a non-continuous slit 24, wherein the useful part 25 of the superfluous part 26 of the floor panel 1B remain connected for means of a remaining connection 29 in the form of a material part present on the top side of the floor panel 1B. Preferably, this material part, as in the present case, comprises a part of the core 30.

Figure 11:
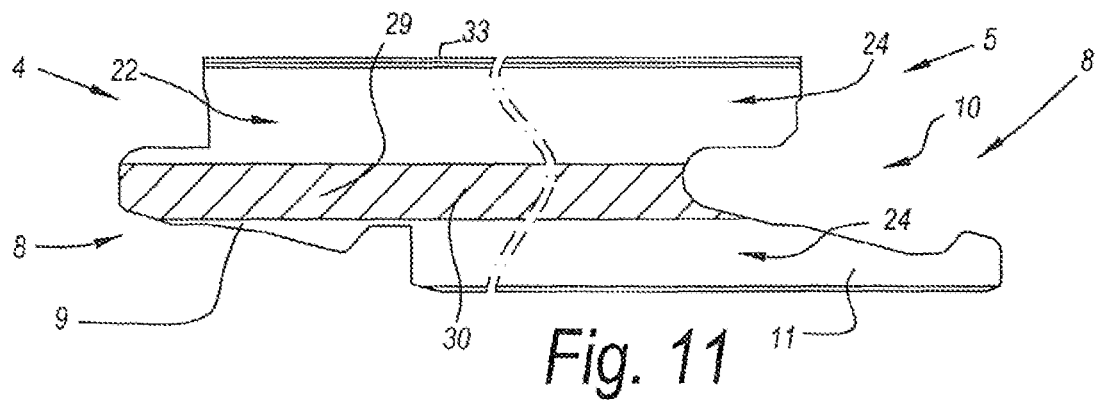

FIG. 11 shows an embodiment in which the line of break 22 is configured as two non-continuous slits 24; one which is configured from the bottom side of the floor panel 1B and one which is configured from the top side, or decorative side 21 of the floor panel 1B. The useful part 25 remains connected to the superfluous part 26 via a remaining connection 29 in the form of a material part of the core 30.

Figure 12:
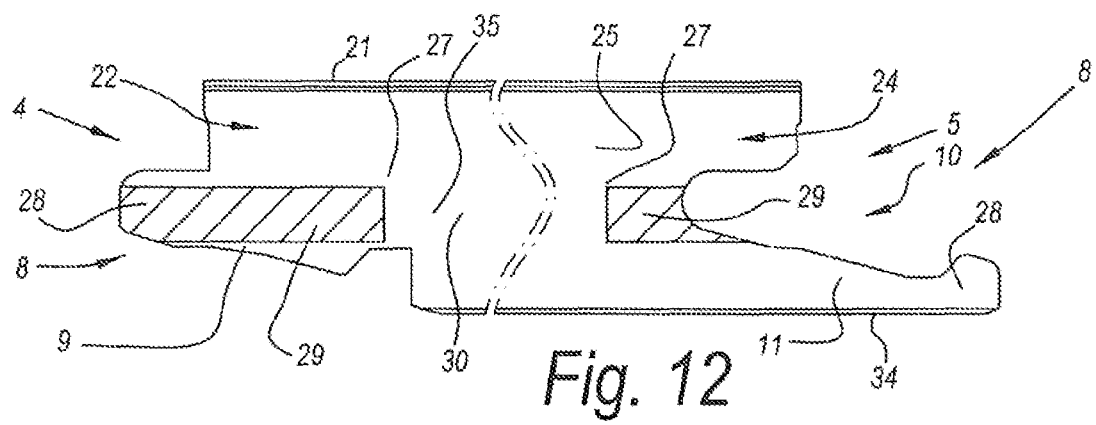

FIG. 12 shows an embodiment in which the line of break 22 is approximately configured as in FIG. 11, but with the difference that the slits 24 meet each other partially and thus form a continuous slit for a part 35. The relevant part 35 in this case extends between positions 27 which, on two opposite edges 4-5, are proximal to the distal ends 28 of the coupling parts 8 present there.

Figure 13:
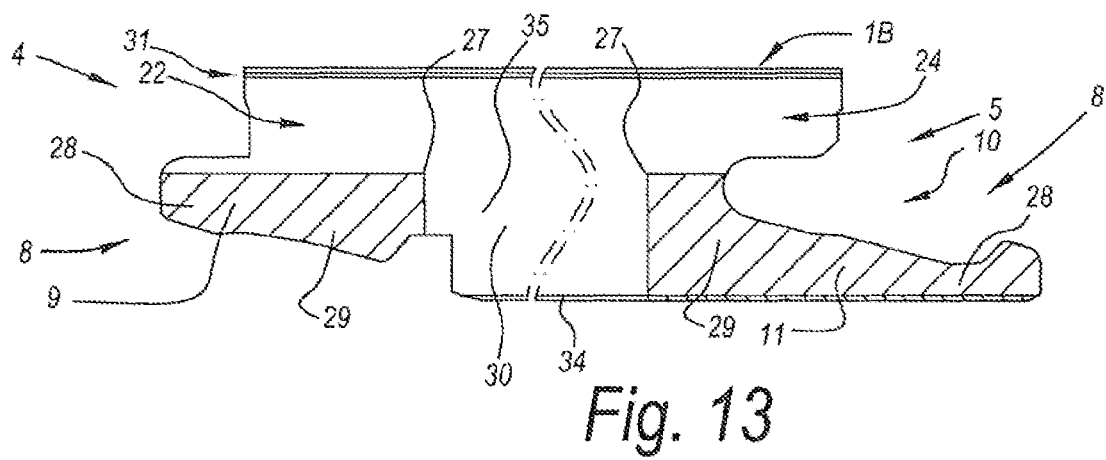

FIG. 13 shows an embodiment in which the line of break 22 is approximately configured as in FIG. 9, but with the difference that the slit 24 is configured to be continuous for a part 35. The relevant part 35 in this case extends between positions 27 which, on two opposite edges 4-5, are proximal to the distal ends 28 of the coupling parts 8 present there.

Figure 14:
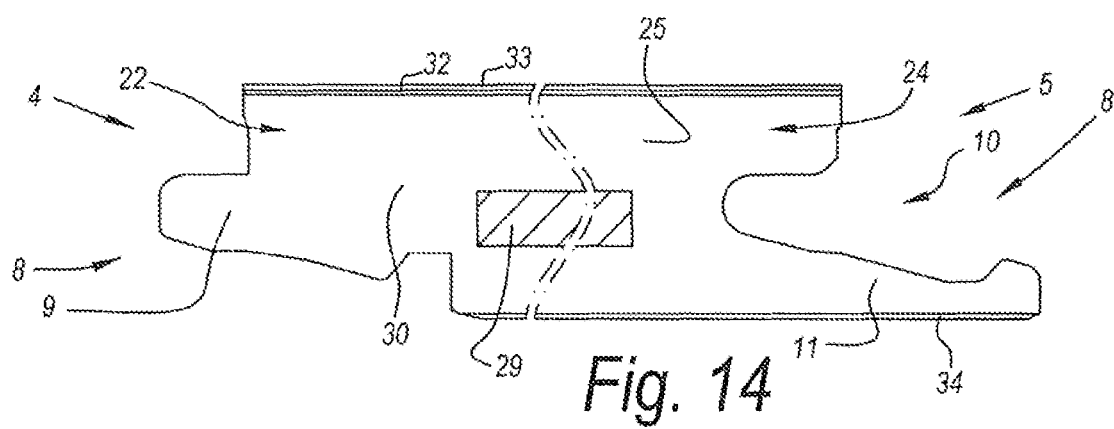

FIG. 14 shows another embodiment approximately as in FIG. 11, but where the remaining connection 29 is configured as a remaining material part of the core 30 which is situated centrally or, in other words, is situated further inwards than the profile of the coupling parts 8. In this way, the coupling parts 8 are not influenced by the interruption of the remaining connection 29 between the useful part 25 and the superfluous part 26 of the relevant second floor panel 1B.

Figure 15:
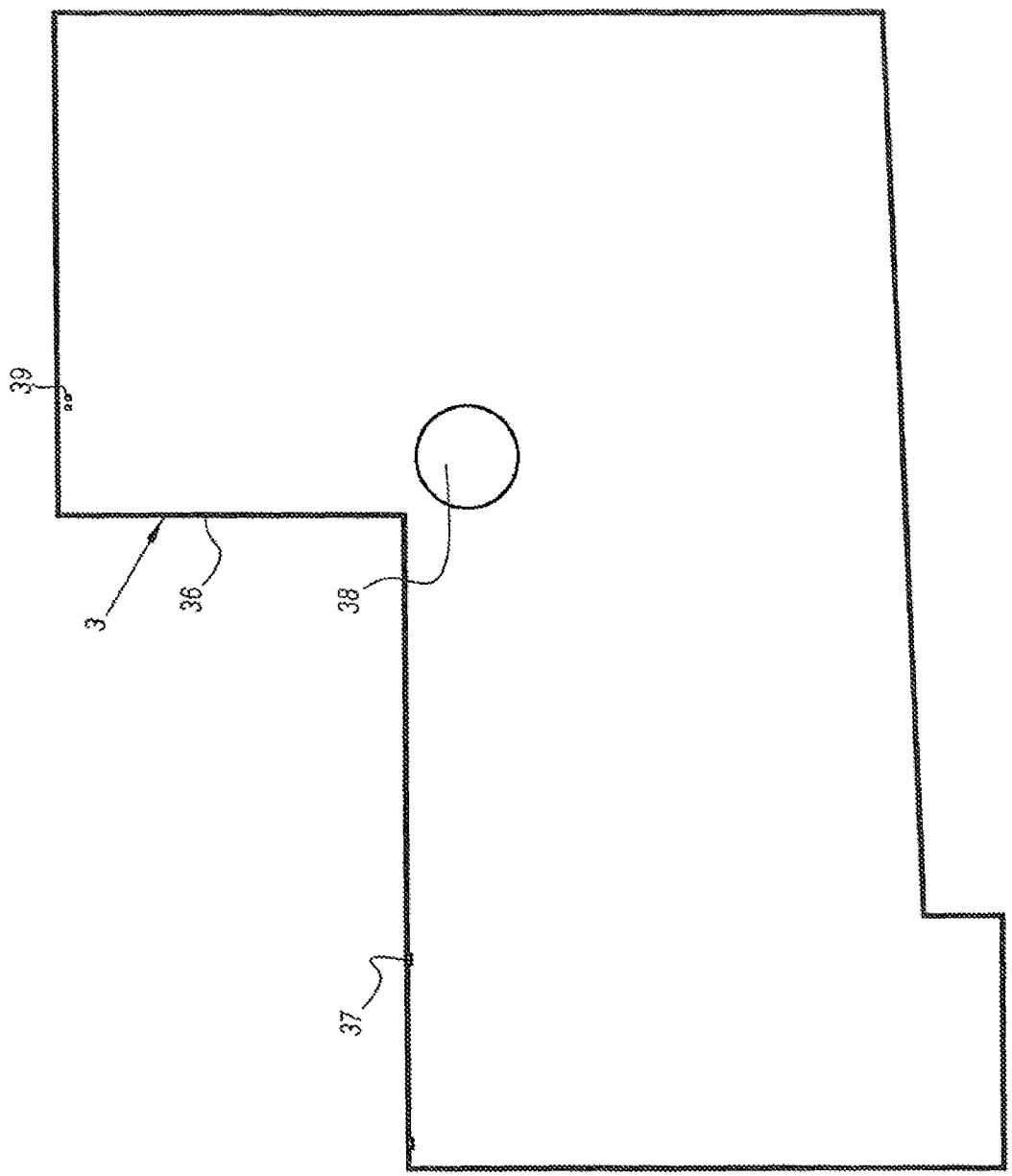
FIG. 15 shows a top view of a room to be floored.

FIG. 15 is a graphical representation of a data set which is generated in accordance with the ground surface area or floor plan of a room 3 to be floored. The data set in this case comprises data in accordance with the walls 36, frames of doors 37, pillars 38 or support posts, passage openings 39 for lines and so on. In order to floor the room 3, the user must select a flooring product. As an alternative, a flooring product may also be presented automatically, or the user may select between a limited number of presented flooring products.

Figure 16:
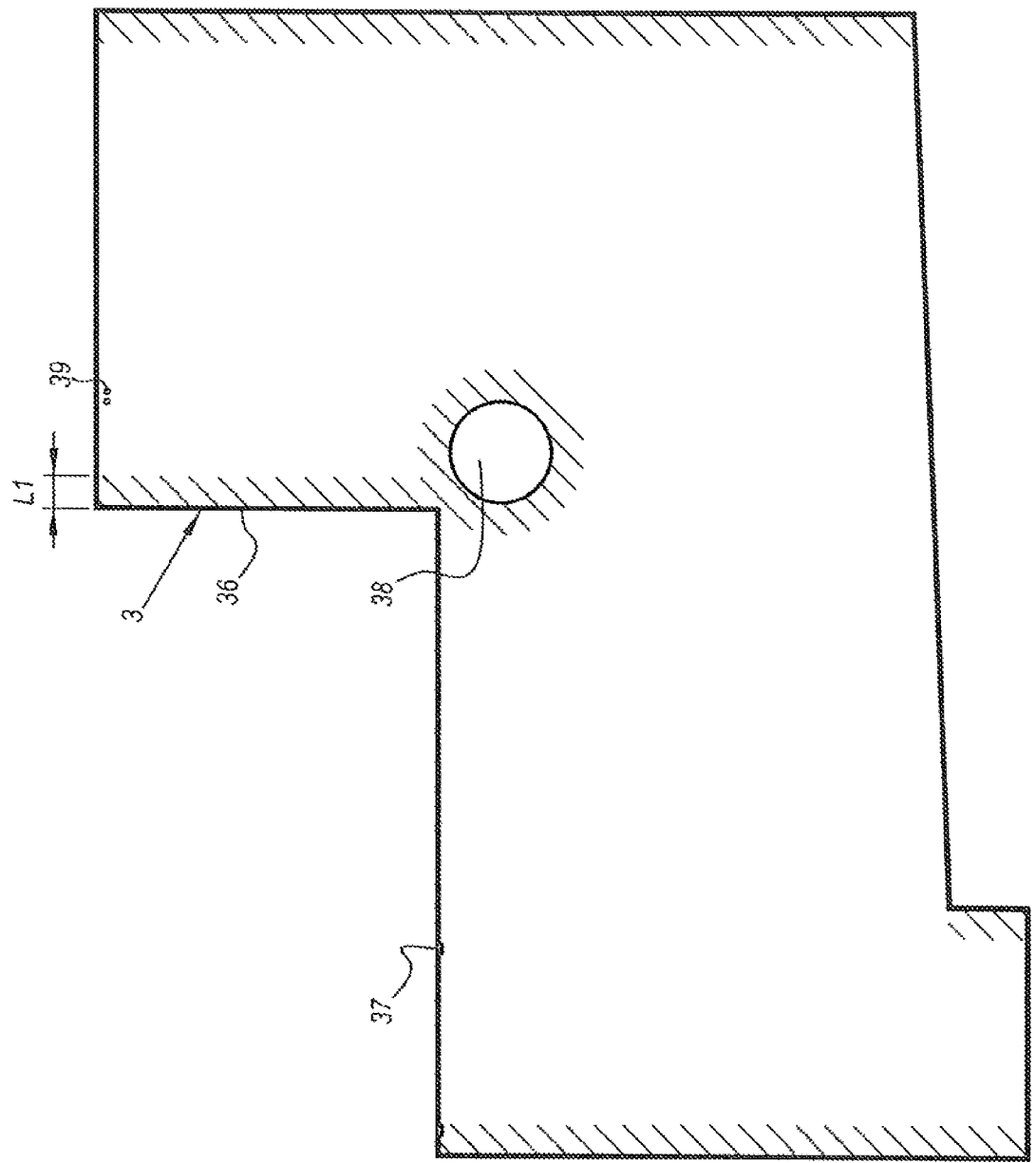
FIGS. 16 and 17 diagrammatically show several steps in a method according to the invention.

FIG. 16 shows using hatching that the database of possible solutions used according to the invention excludes that short edges 6-7 of floor panels are positioned closer than a minimum distance to be maintained or minimum dimension L1 from the start or end of a row 14.

Figure 17:
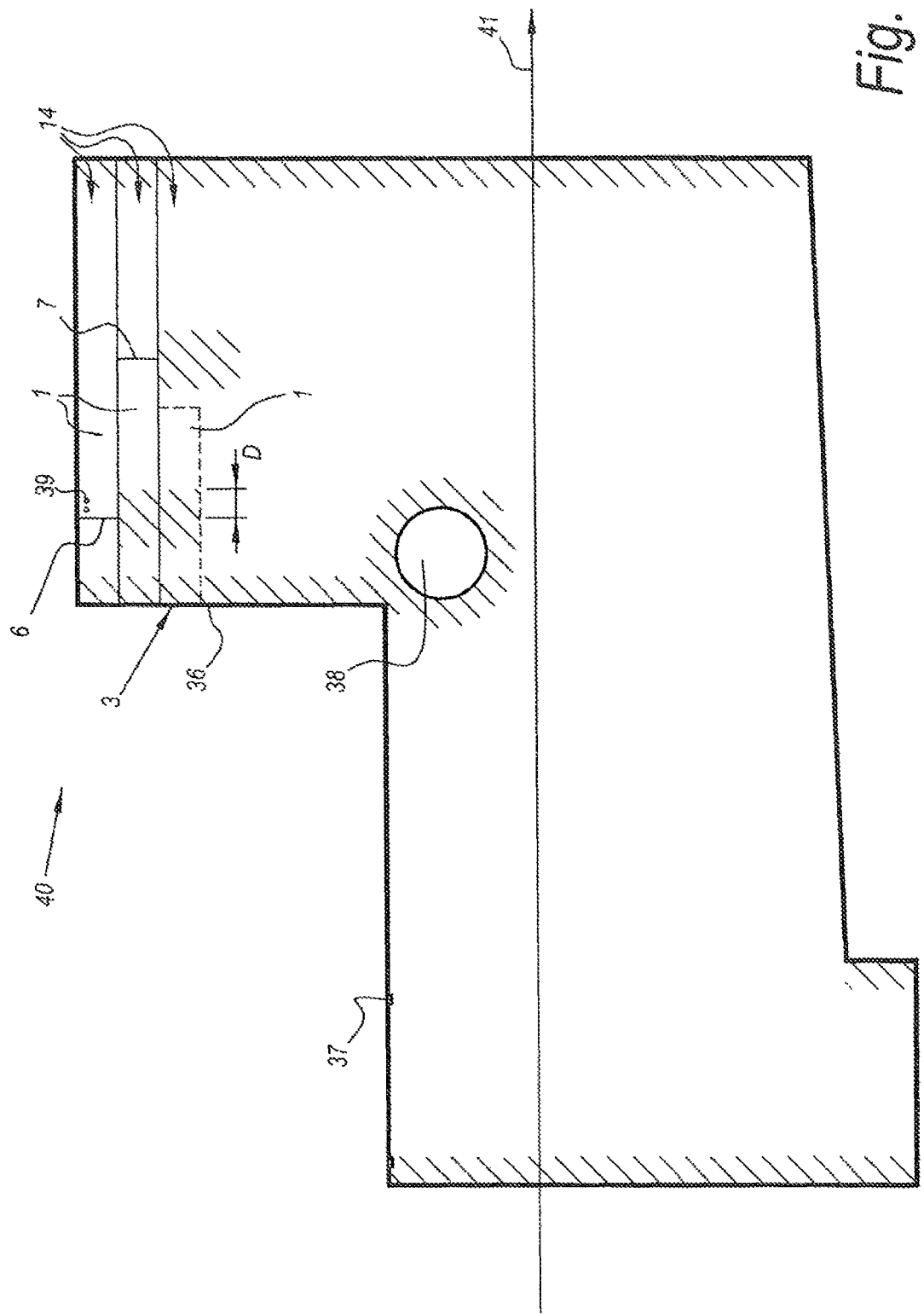

FIG. 17 shows that the database of possible solutions is further restricted on the basis of the position of the short edges 6-7 of already presented panels 1, namely in such a way that the minimum distance D between short edges 6-7 of panels 1 in adjacent rows 14 remains larger than a minimum required for the flooring product. In this case, it is ensured that this distance D is maintained in the two closest rows 14. It is of course possible that the distance to be maintained decreases the further away the row is from the relevant short edge 6-7.

FIG. 17 further shows that a following panel 1, illustrated here by a dashed line, is presented in accordance with the database of possible solutions, namely with a short edge 6-7 which is positioned outside the hatched areas.

In the case of FIGS. 15 to 17, it is also noted that the user may select the desired type of laying plan 40, in this case an irregular bond, himself. In this case, it is possible for the user to also select the main direction 41 of the rows 14, for example, as here, parallel to the long walls.

FIG. 2 shows that the required number of first floor panels 1A, and the number of the second floor panels 1B with their required adaptation 12 can be calculated on the basis of the final detailed laying plan 40, so that the set of floor panels 2 suitable for flooring the room 3 from FIG. 15 can be composed. The calculation result obtained using the method described here can be used to control a woodworking machine for carrying out the required adaptations 12, and/or for providing lines of break 22 and/or indications 20 as described above.

Figure 18:
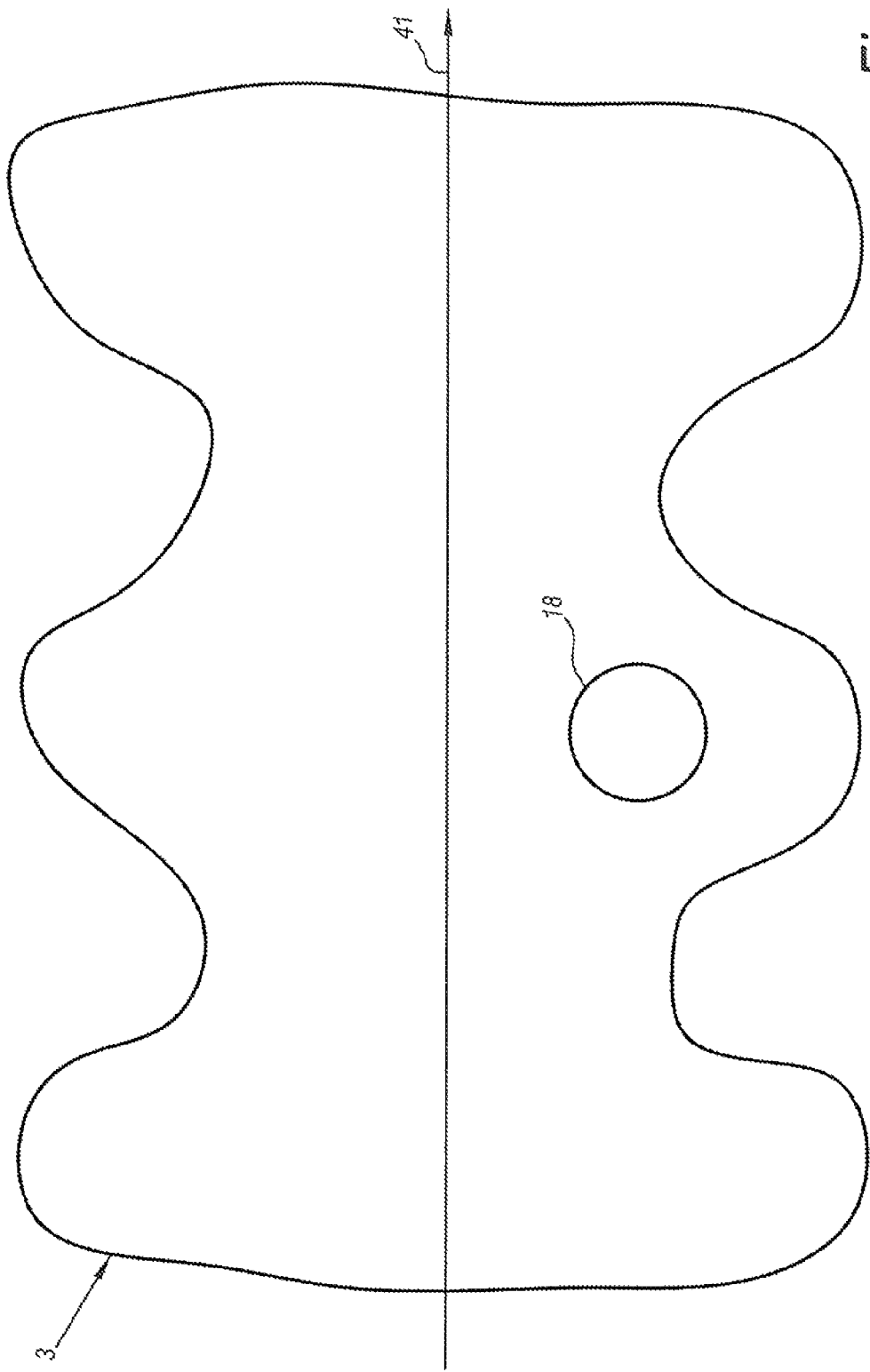
FIG. 18 shows a floor plan of a room to be floored in a view similar to that of FIG. 15.

FIG. 18 is a graphical representation of a data set which is generated in accordance with the floor plan of a previously theoretical room 3 to be floored. FIGS. 18 to 21 illustrate a method for generating a detailed laying plan, in this case using irregular bond, for the room in FIG. 18. The previously theoretical floor plan makes it possible to illustrate a multiplicity of possible situations and difficulties when determining a detailed floor plan, and shows that a solution can be found in each case.

FIG. 18 shows the desired main direction 41 indicated by the user for the rows 14 of the final laying plan. Such a main direction 41 may also be calculated automatically, for example by determining the main axes of the floor plan, and using the main axis having the greatest length as the main direction 41. In the non-illustrated case that the floor plan has an elliptical shape, the longitudinal axis would automatically be used as the main direction in such a case.

Figure 19:
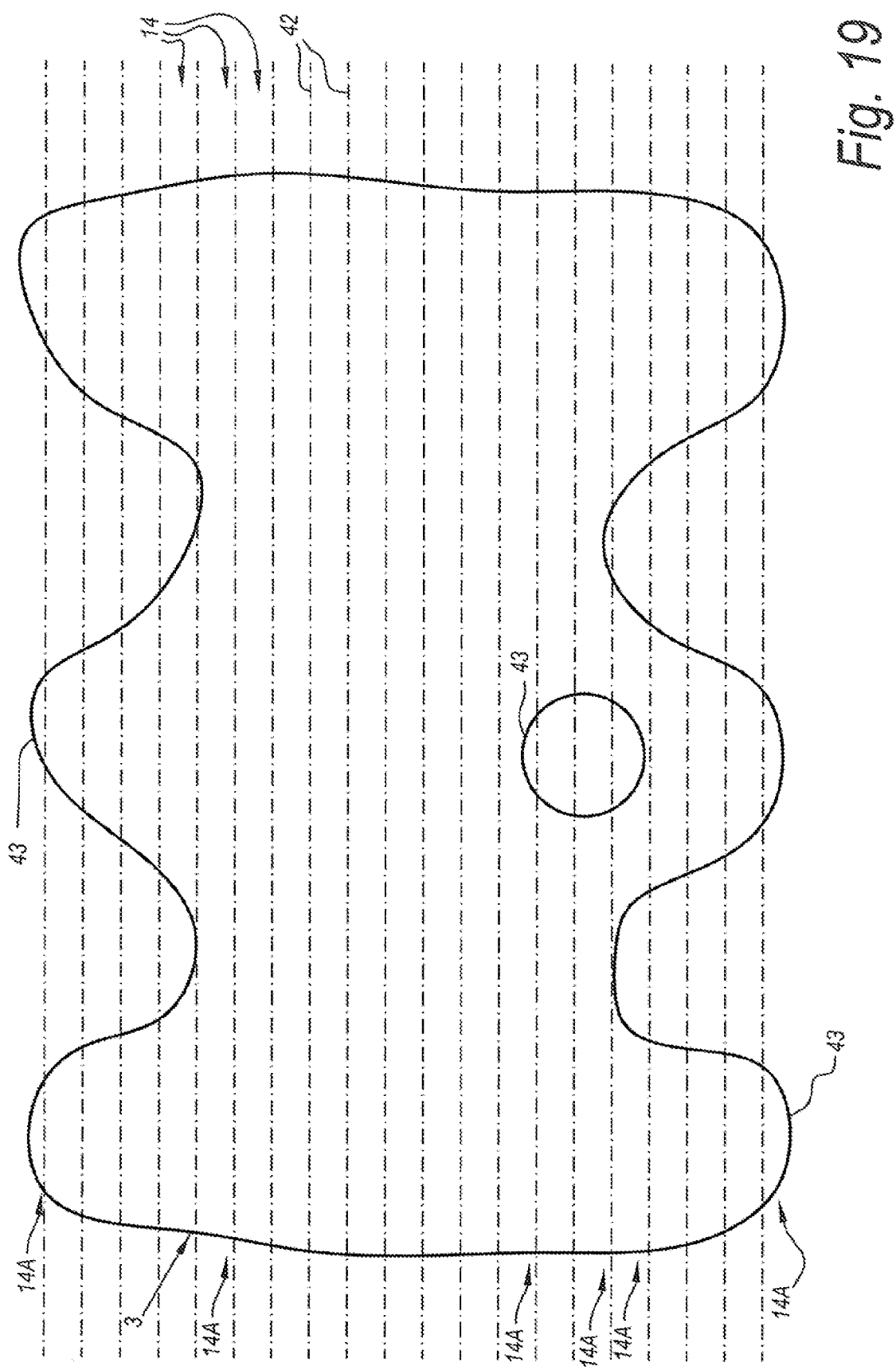
FIGS. 19 to 21 diagrammatically show several steps in a method having the features of the present invention.

FIG. 19 diagrammatically shows the result of the step of determining the position of the longitudinal edges 42 of panel rows 14. These longitudinal edges 42 of course run in the determined main direction 41. Their mutual distance M is determined by the selection of the flooring product. In this case, it is a flooring product having floor panels 1A of only one common width. The position of the longitudinal edges 42 is automatically carried out in such a way that the average width of the panel rows 14A is greatest at the edges 43, and wherein the width for each row 14A at such an edge 43 is at least half the width of the panels 1A from the relevant flooring product over as great a length of the relevant row 14A as possible.

Figure 20:
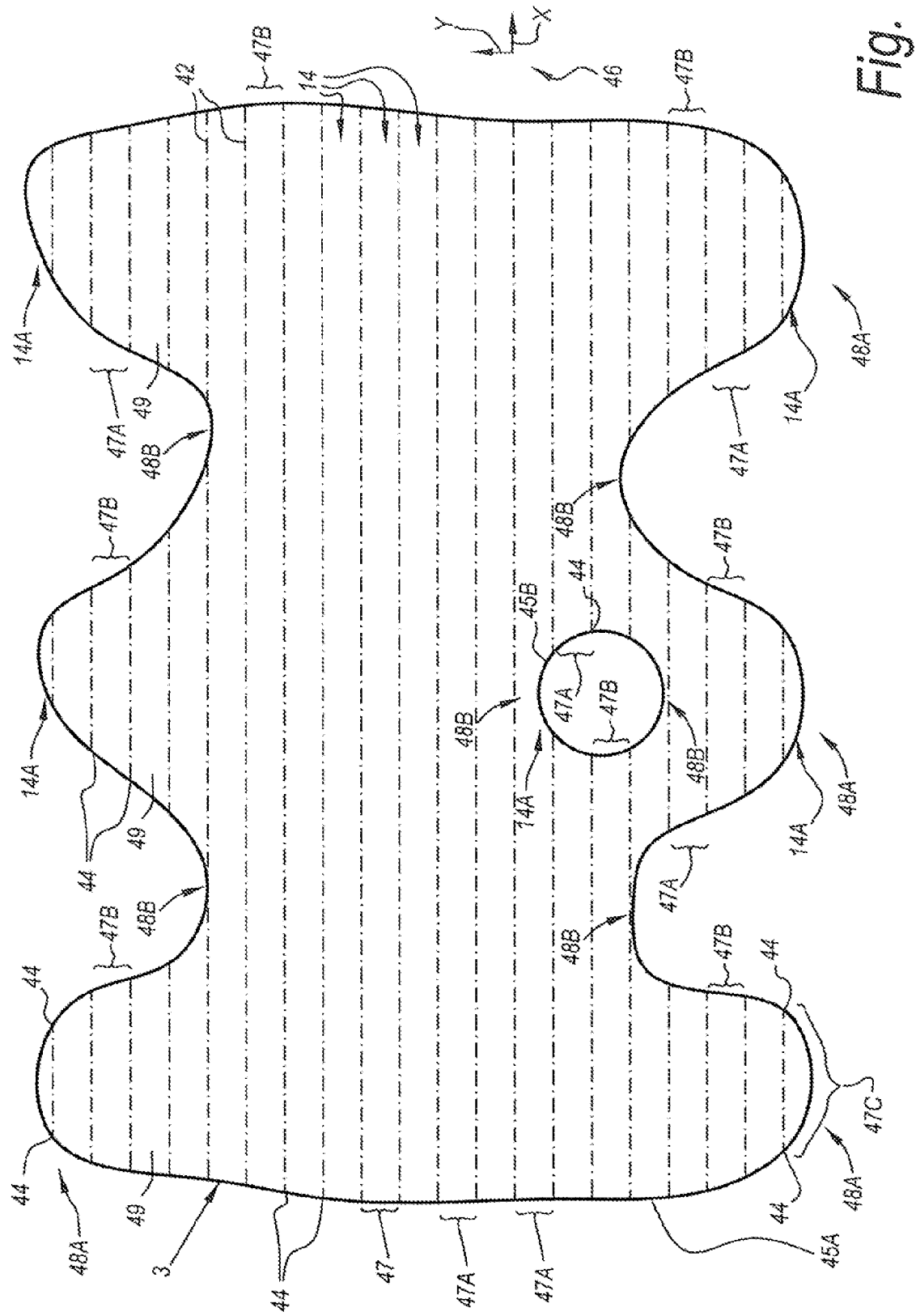

FIG. 20 diagrammatically shows the result of the step of calculating cutting points 44 between longitudinal edges 42 of panel rows 14 and the digital floor plan, more specifically the external boundaries 45A and preferably also the internal boundaries 45B of this floor plan.

On the basis of said cutting points 44, it is then possible to determine start and stop positions in panel rows of full width, and also convex loops 48A and concave loops 48B which extend in the same panel row 14. To this end, it is possible to run through the boundaries 45A-45B systematically, for example clockwise, as in the present case, and to compare the coordinates of two successive cutting points 44. For simple calculation, it is possible, as in the present case, to use an orthogonal coordinate system 46, the X axis of which coincides with said main direction 41. In this way, the transitions 47 between two successive cutting points 44 can be classified as follows:

transitions 47A on external boundaries 45A where the Y coordinate of the cutting points 44 increases and transitions 47A on internal boundaries 45B where the Y coordinate of the cutting points 44 decreases. Such a transition 47A is a start position of a row 14 of full width, which starts with a second floor panel that may be shortened on the left-hand side;

transitions 47B on external boundaries 45A where the Y coordinate of the cutting points 44 decreases and transitions 47B on internal boundaries 45B where the X coordinate of the cutting points 44 increases. Such a transition 47B is an end position of a row 14 of full width, which ends with a second floor panel that may be shortened on the right-hand side;

transitions 47C on external or internal boundaries 45A-45B where the Y coordinate of the cutting points 44 does not change. Such a transition is a loop 48A-48B. If, on an external boundary 45A, between the relevant cutting points 44, a transition is made in the case of an increasing X coordinate from an increasing Y coordinate to a decreasing Y coordinate, or if, in the case of a decreasing X coordinate a transition is made from a decreasing Y coordinate to an increasing Y coordinate, this is a convex loop 48A. If it is an internal boundary 45B, such coordinate changes relate to a concave loop 48B. If, on an external boundary 45A, between the relevant cutting points 44, a transition is made in the case of an increasing X coordinate from a decreasing Y coordinate to an increasing Y coordinate, or if, in the case of a decreasing X coordinate a transition is made from an increasing Y coordinate to a decreasing Y coordinate, this is a concave loop 48B. If it is an internal boundary 45B, such coordinate changes relate to a concave loop 48A. Convex loops 48A give rise to floor panels 1B whose width is shortened. Concave loops 48B give rise to floor panels 1B which, in themselves, form part of a larger adjacent row 14 which extends between a transition 47A and transition 47B, adjoining the transition 48B in question.

As mentioned, the boundaries 45A and 45B above are run through clockwise. It goes without saying that the boundaries can in general be run through in any order whatsoever, for example anticlockwise, in which case the classification explained above needs to occur on the basis of an adapted logic. It is also possible for different boundaries of the same floor plan to be run through in a different way, for example external boundaries 45A clockwise, and internal boundaries 45B anticlockwise. The coordinate system may also be defined in a different way, as a result of which once again a different logic needs to be used for the above-mentioned classification. Such adaptations are within the reach of the person skilled in the art.

Transitions 47A and 47B may be linked to the same row 14 in a simple manner by comparing their Y coordinates. If, as is the case here, several transitions 47A-47B are present with common Y coordinates, these are ordered by X coordinate, resulting in independent row parts 49 with their separate start transition 47A and stop transition 47B. "Independent" refers to the fact that the final realization of such a row part 49 can be carried out independently of the other row parts 49 in the same row 14.

Figure 21:
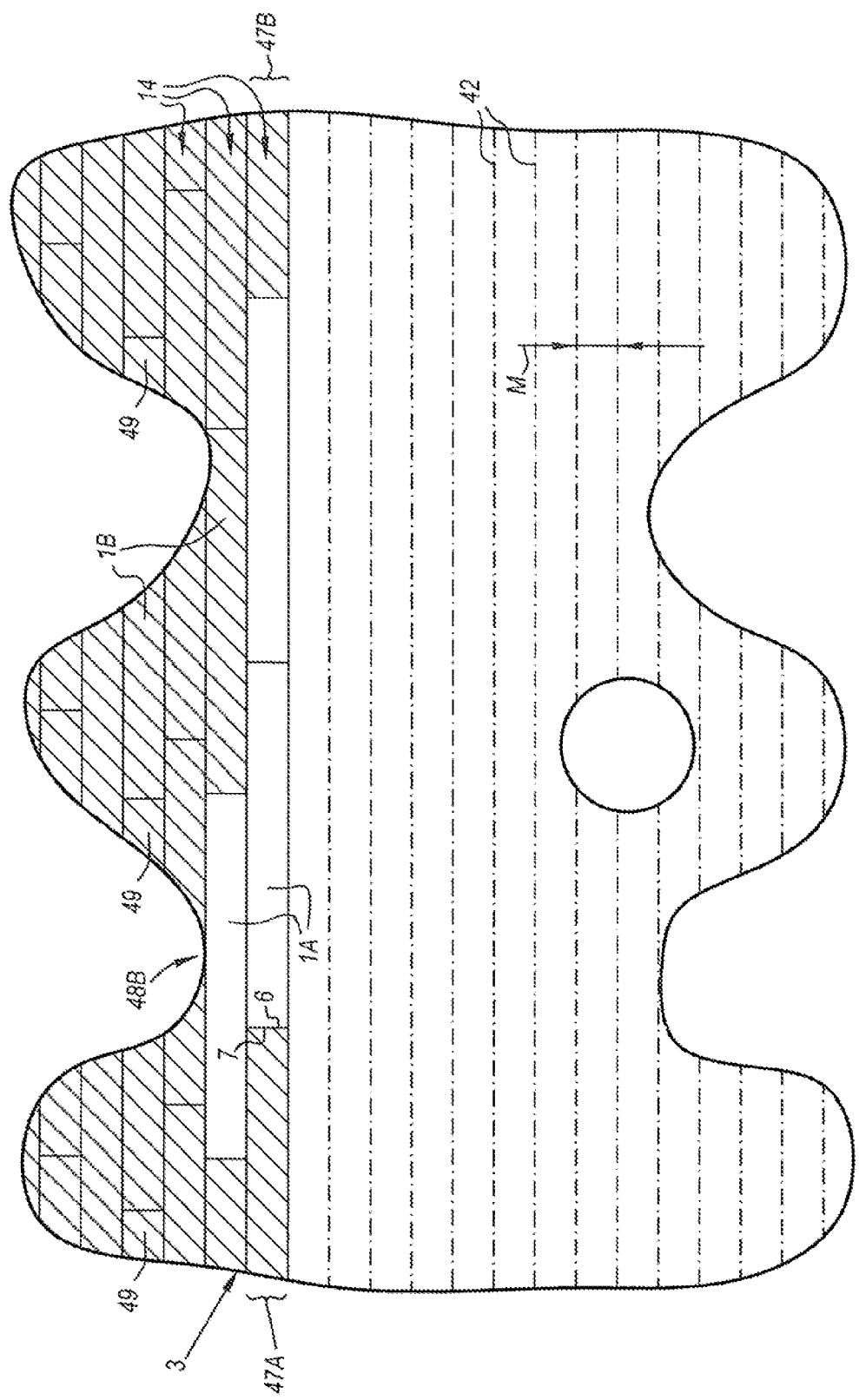

FIG. 21 shows that the computer proposes first floor panels 1A and second floor panels 1B between each of the transitions 47A and 47B, or in other words in each row 14 or independent row part 49, taking into account desired limitations, such as the minimum distance D to be maintained between short edges in adjacent rows 14, namely by proposing floor panels 1A and 1B from a database of possible solutions, and taking into account possible concave loops 48B which may extend in the relevant row 14 or row part 49. The convex loops 48A can in themselves by realized separately by second floor panels 1B. As stated in the introduction, the first floor panels 1A and the second floor panels 1B can in each case be based on a database of available panels or panel parts.

When each transition 47A-47B-47C has been dealt with, the detailed laying plan is complete. The detailed laying plan obtained is then further used as explained above, for example for controlling a woodworking machine for carrying out the required adaptations 12, and/or for providing lines of break 22 and/or indications 20. It is clear that, in the present example, the required adaptations 12 in each case consist of the realization of the part of the internal boundary 45B or external boundary 45A at the location of the transitions 47A-47B-47C in question.

Figure 22:
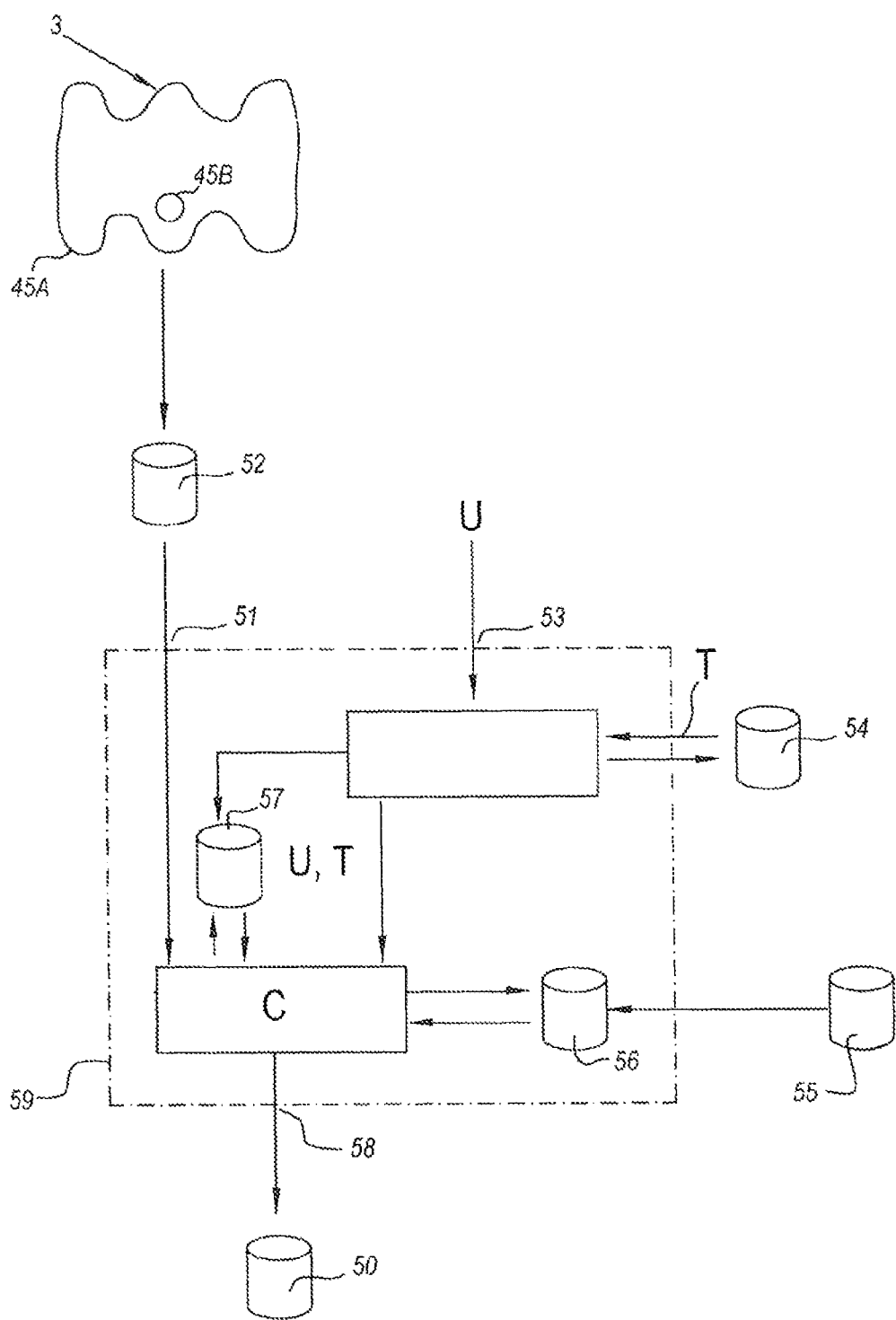
FIG. 22 shows a workflow for attaining data suitable for the manufacture of a set of floor panels having the features of the invention.

FIG. 22 shows, highly diagrammatically, another preferred workflow for generating data 50 suitable for composing a set of floor panels having the features of the first aspect. As first input 51, a data set 52 in accordance with the floor plan of a room 3 to be floored is used. This data set 52 preferably comprises at least information, preferably the coordinates in an orthogonal coordinate system for example, regarding the position of external and/or internal boundaries 45A-45B. As second input 53, information U, for example regarding the wishes of the user and the geographical location of the installation, is used. The wishes of the user may relate, for example, to the desired flooring product, the desired laying pattern, for example irregular bond, and so on. On the basis of this information U, on the one hand information T relating to technical limitations for the installation is retrieved from a database 54, and on the other hand a database 55 of available floor panels of the chosen flooring product is selected. The database 55 is used in order to fill a temporary database 56 of available floor panels 1A for the purpose of flooring the room 3 in question. Such a database 56 may, for example, contain data relating to the actual length of each floor panel. The latter is particularly useful in the event of a flooring product having panels 1A of random length.

The database 56 of first floor panels 1A, the information T and information U are then used for the calculation C of the detailed floor plan. The information T and U is also used to create an initial database 57 of possible solutions. For the calculation C, this may relate, for example, to a calculation C as explained on the basis of FIG. 18 to 21, or 15 to 17. In this case, an available floor panel is in each case retrieved from the database 56 during the calculation C in order to add a first floor panel 1A or in order to realize a second floor panel 1B for the composition of the set. In the latter case, the superfluous part 26 of the second floor panel 1B is put back into the database 56 so that it is available for the possible realization of a subsequent second floor panel 1B. The available floor panel 1A or the second floor panel 1B to be realized is tested against the database 57 of possible solutions. The test consists of checking whether the relevant floor panel can offer a possible solution. Conversely, it is also possible for a suitable available floor panel to be chosen from the database 56 on the basis of the possible solutions in the database 57. If a solution is found, the process continues with the presentation of the subsequent floor panel, and the database 57 of possible solutions is further restricted on the basis of the tested floor panel.

As output 58, data 50 ultimately arise which are suitable for composing a set of floor panels 2 suitable for flooring the room 3. These data 50 comprise at least information relating to the required adaptations 12 of the second floor panels 1B. The data 50 may, for example, comprise the coordinates of the contour of the adaptation 12 for each second floor panel 1B. The data 50 may also comprise information regarding the detailed laying plan, thus, for example, the data 50 may comprise the envisaged position of each first and second floor panel 1A-1B in the room 3.

In FIG. 22, the rectangle in the dash-dotted line 59 shows processes which preferably take place internally in a computer.

It is clear that the present invention also relates to microprocessors which are programmed to generate a detailed laying plan for a room 3 to be floored and/or to generate data 50 suitable for composing a set of floor panels 2 which is suitable for flooring a room 3, and/or to digital data carriers which comprise such a program or essential parts thereof.

According to a particular independent aspect, the present invention also relates to a set of floor panels intended for flooring a room, wherein said floor panels comprise, or consist of, at least a stone material, a stone-like material or a ceramic material, such as a ceramic tile, characterized in that the set comprises several first floor panels (1A), wherein these first floor panels exhibit a common shape and dimension, and in that the set further comprises one or more second floor panels (1B) which exhibit an adaptation of the common shape and/or the common dimension or are provided for this purpose, wherein said adaptation (12) is in accordance with said room (3). Although not necessary, it is preferable if such set of floor panels is composed using a method having the features of said first independent aspect.

In the case of ceramic tiles, during the composition of the set of the above particular independent aspect, account is preferably taken of the desired width of the intervening cement joint, and/or the width of the intervening cement joint can be determined or optimized in response to the obtained laying plan.

In the case of stone imitations, these may be square tiles, or elongate tiles. For such stone imitations, a laying plan is preferably proposed either in a checkerboard pattern or in half bond.

In the event of elongate ceramic tiles, which, for example, are an imitation of parquet panels, a laying plan is preferably proposed in which short edges of tiles in adjacent rows are located not too close but also not too far from one another. This achieves a reasonable plank effect, while the possible curvature of the longitudinal sides only gives rise to height differences between the adjacent rows to a limited extent.

The present invention is by no means limited to the embodiments described above, but such methods, sets of floor panels and data carriers can be realized in different ways without departing from the scope of the invention.

The invention claimed is:

1. A method for composing a set of floor panels for flooring a room, based on a data set in accordance at least with a ground surface area of said room,
   wherein the method contains the step of establishing a laying plan suitable for said room,
   wherein the step of establishing a laying plan is carried out by means of a computer,
   wherein the step of establishing a laying plan includes the computer proposing a laying plan on a basis of said data set, taking into account desired limitations,
   wherein said limitations are used to restrict a first database including possible solutions;
   wherein the laying plan is composed row by row
   wherein in a first row the laying plan comprises at least a first floor panel and a second floor panel, wherein the second floor panel comprises an adaptation of a shape and dimension of rectangular floor panels available for establishing the laying plan, wherein said adaptation of the shape and dimension results in the second floor panel and a superfluous panel part;
   wherein the method further comprises using the superfluous panel part as a useful part in the laying plan in a second row that is yet to be composed.

2. The method according to claim 1, wherein said first database of possible solutions comprises coordinates of possible positions of short edges of floor panels.

3. The method according to claim 1, wherein said step of establishing a laying plan comprises at least the following sub-steps:
   proposing at least a first panel in a first row, wherein said first panel complies with said first database of possible solutions;
   updating or restricting said first database of possible solutions is provided on a basis of at least a position of short edges of the first panel;
   proposing at least a first panel in a second row, wherein said panel complies with the updated or restricted version of said first database.

4. The method according to claim 1, wherein, instead of using said first database of possible solutions, a second database of undesirable solutions is used.

5. The method according to claim 1, wherein said database of possible solutions at least excludes that short edges of floor panels in adjacent rows are positioned closer than a minimum distance to be maintained.

6. The method according to claim 1, wherein said database of possible solutions at least excludes that a short edge of a floor panel is positioned closer than a minimum distance to be maintained from a start or an end of a row.

7. The method according to claim 1, wherein the method further comprises a preceding step of generating said data set at least in accordance with the ground surface area of the room to be floored.

8. The method according to claim 1, wherein the method further comprises the step of producing the required floor panels according to the established laying plan, wherein the required floor panels exhibit an adaptation or are provided for an adaptation, and/or the step of providing at least a required quantity of floor panels having common dimensions.

9. A data carrier having a software code that, when executed by a processor, leads or may lead to a method having the features of claim 1.

10. A set of floor panels intended for flooring a room,
    wherein the set comprises a plurality of first floor panels,
    wherein these first floor panels exhibit a common shape and dimension, and in that the set further comprises one or more second floor panels that exhibit an adaptation of the common shape and/or the common dimension or are provided for this purpose,
    wherein said adaptation is in accordance with said room and wherein the set of floor panels is composed using a method having the features of claim 1.

11. The set of floor panels according to claim 10, wherein the adaptation is carried out by removing the superfluous part of the relevant floor panel.

12. The set of floor panels according to claim 10, wherein a plurality of said floor panels that exhibit an adaptation, or are provided for this purpose, are packaged together in a packaging unit, and in that this unit also contains the superfluous pieces created by said adaptation.

13. The set of floor panels according to claim 11, wherein a plurality of said floor panels that exhibit an adaptation, or are provided for this purpose, are packaged together in a packaging unit, and in that this unit also contains the superfluous pieces created by said adaptation.

* * * * *